US006845938B2

(12) United States Patent
Muravez

(10) Patent No.: US 6,845,938 B2
(45) Date of Patent: Jan. 25, 2005

(54) SYSTEM AND METHOD FOR PERIODICALLY ADAPTIVE GUIDANCE AND CONTROL

(75) Inventor: Randall J. Muravez, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 120 days.

(21) Appl. No.: 09/955,151

(22) Filed: Sep. 19, 2001

(65) Prior Publication Data

US 2004/0155142 A1 Aug. 12, 2004

(51) Int. Cl.[7] .............................................. F41G 7/00
(52) U.S. Cl. ...................... 244/3.11; 244/3.1; 244/3.13; 244/3.14; 342/62
(58) Field of Search ................................ 244/3.1–3.19; 342/62–65

(56) References Cited

U.S. PATENT DOCUMENTS

| | | | | |
|---|---|---|---|---|
| 3,567,163 A | * | 3/1971 | Kepp et al. ................. | 244/3.14 |
| 4,220,296 A | * | 9/1980 | Hesse ......................... | 244/3.14 |
| 4,383,661 A | * | 5/1983 | Ottenheimer et al. ....... | 244/3.14 |
| 4,456,862 A | * | 6/1984 | Yueh ........................... | 244/3.14 |
| 4,494,202 A | | 1/1985 | Yueh | |
| 4,533,918 A | | 8/1985 | Virnot | |
| 4,750,688 A | * | 6/1988 | Davies ....................... | 244/3.11 |
| 4,823,299 A | | 4/1989 | Chang et al. | |
| 4,954,837 A | | 9/1990 | Baird et al. | |
| 5,058,836 A | | 10/1991 | Nobel | |
| 5,080,300 A | * | 1/1992 | Stubbs et al. ............... | 244/3.11 |
| 5,118,050 A | * | 6/1992 | Arnold et al. .............. | 244/3.14 |
| 5,379,966 A | * | 1/1995 | Simeone et al. ............ | 244/3.11 |
| 5,501,413 A | | 3/1996 | Kilger et al. | |
| 5,507,452 A | | 4/1996 | Mayersak | |
| 5,543,804 A | | 8/1996 | Buchler et al. | |
| 5,546,309 A | | 8/1996 | Johnson et al. | |
| 5,660,355 A | | 8/1997 | Waymeyer | |
| 5,788,179 A | | 8/1998 | Wicke | |
| 5,805,102 A | * | 9/1998 | Heap et al. ................. | 244/3.14 |
| 5,835,056 A | * | 11/1998 | Heap et al. ................. | 244/3.14 |
| 5,886,257 A | | 3/1999 | Gustafson et al. | |
| 6,006,145 A | * | 12/1999 | Bessacini .................... | 244/3.1 |

OTHER PUBLICATIONS

Warren, R.S., et al., AIAA Paper No. 73–836, AIAA Guidance and Control Conference, Key Biscayne, Florida, Aug. 20–22, 1973.

Nesline, F. William, et al., "Line–of–Sight Reconstruction for Faster Homing Guidance", Presented as Paper 83–2170 at the AIAA Guidance and Control Conference, Gatlinburg, Tenn., Aug. 15–17, 1983.

Zarchan, Paul, "Proportional Navigation and Weaving Targets", Journal of Guidance, Control, and Dynamics, vol. 18, No. 5, Sep.–Oct. 1995.

(List continued on next page.)

*Primary Examiner*—Bernarr E. Gregory
(74) *Attorney, Agent, or Firm*—Burns, Doane, Swecker & Mathis, L.L.P.

(57) ABSTRACT

A system and method that guides a device to an object using periodically adaptive guidance. The guidance and control system creates a reconstructed line-of-sight (LOS) vector to avoid system destabilization associated with small angle approximation during high bore sight engagements. The guidance system adaptively estimates the periodic maneuver of evasive objects with a set of harmonically balance Kalman filter banks. The Harmonically Balanced Kalman filter banks generate a set of probabilities that weight the effect of each individual Kalman filters on a resultant guidance command signal. The guidance command signal generated by the system acts perpendicular to the object LOS. The guidance and control system uses vectored proportional navigation guidance laws, optimal proportion navigation laws and periodically adaptive augmented guidance laws to generate a guidance command signal to supply to an autopilot.

26 Claims, 12 Drawing Sheets

OTHER PUBLICATIONS

Zarchan, Paul, "Tactical and Strategic Missile Guidance", Progress in Astronautics and Aeronautics, vol. 176, Third Edition, no date.

Zarchan, Paul, "Weaving Targets", Zarchan, 3$^{rd}$ Edition, Chapter 21, no date.

Zarchan, Paul, "Advanced Guidance Laws", Zarchan, 3$^{rd}$ Edition, Chapter 8, no date.

Muravez, Randall, Joseph, "Multiple Model Adaptive Estimation and Prediction with the Harmonically Balanced Kalman Filter Bank", A Thesis Presented to the Faculty of California State Polytechnic University, Pomona—In Partial Fulfillment of the Requirements for the Degree Master of Science in Engineering, 1989.

* cited by examiner

SYSTEM AND METHOD FOR PERIODICALLY ADAPTIVE GUIDANCE AND CONTROL

BACKGROUND OF THE INVENTION

1. Field of the Invention

The present invention relates to guidance and control systems, and more particularly, to adaptive guidance and control systems.

2. Background Information

When guiding a device, such as an interceptor missile, toward a moveable object or target, it is known to address target maneuvering in the control of the missile. For example, the object may be configured to induce a miss distance by initiating an acceleration maneuver. Against a missile utilizing a proportional guidance system, target maneuvering can be controlled as a function of any known missile parameters, such as the missile's autopilot time constant (its agility) and effective navigation ratio. If the target does not have a priori knowledge of the missile parameters, does not know time to intercept, and/or does not have visual or electronic contact with the missile, then periodic maneuver sequences such as a barrel roll or weave maneuver can be executed. In addition to calculated maneuvering, targets such as tactical ballistic missiles (TBM) can unintentionally spiral or weave into resonance as they re-enter the atmosphere due to either mass or configuration asymmetries.

The control of a moving object to a maneuverable target is discussed in the book, "Tactical and Strategic Missile Guidance", Third Edition, Volume 176, by Zarchan, and in a Zarchan article, "Proportional Navigation and Weaving targets", Journal of Guidance, Control, and Dynamics, Volume 18, No. 5, September–October 1995, pages 969–974, both of which are incorporated herein by reference. Zarchan discloses a scalar classical pro nav guidance law as:

$$n_c = N' V_c \lambda = \frac{N'(y + \dot{y}(t_{go}))}{t_{go}^2} \text{ where } \lambda = \left(\frac{y}{R_{TM}}\right) \quad (1)$$

wherein the missile acceleration command ($n_c$) is perpendicular to the target line-of-sight vector for small line-of-sight angles ($\lambda$) as evidenced by the $\lambda=(y/R_{TM})$ approximation. Small angle approximations are used to simplify modern guidance laws that use scalar Y axis Cartesian Kalman filter estimates of target-to-missile range and velocity (y and $\dot{y}$). For a dual-range air-to-air missile, however, guidance laws with these small line-of-sight angle approximations result in excessive missile divert requirements, which waste valuable on-board energy, and can degrade performance.

"Line of Sight Reconstruction for Faster Homing Guidance", presented as Paper 83–2170 at the AIAA Guidance and Control Conference, Gatlinburg, Tenn., Aug. 15–17, 1983; received Aug. 24, 1983: revision received Jan. 3, 1984. Copyright® 1983, by F. W. Nesline and P. Zarchan, which is incorporated herein by reference, describes line-of-sight ( LOS) reconstruction. This Zarchan document discloses another scalar pro nav guidance law as:

$$n_c = \frac{N'(y + \dot{y}(t_{go}) + ZEM_{TM})}{t_{go}^2} - C_4 n_L \quad (2)$$

$$\text{where } ZEM_{TM} = 0.5 t_{go}^2 n_T \quad (3)$$

The missile acceleration command ($n_c$) is over amplified by N' and negated by an achieved missile acceleration quantity ($C_4 n_L$) to make-up for expected dynamics lag in the missile's autopilot. Zarchan also describes a weaving target guidance law with a priori estimates of the target weaving frequency. Equation (2) uses an estimated target acceleration ($n_T$) presented in Equation (3) as the zero effort miss ($ZEM_{TM}$) due to a target maneuver.

Zero effort miss is defined as the distance the missile would miss if the target continued along its present trajectory and there were no more missile acceleration commands. A condition of Equation (3) is that the zero effort miss is caused by constant target acceleration for all time-to-go before intercept. Zarchan derives the zero effort miss due to a target maneuver frequency ($\omega_T$) with target acceleration and acceleration rate magnitudes ($n_T$ and $\dot{n}_T$), and documents the scalar weaving target guidance law as:

$$ZEM_{TM} = \left(\frac{1 - \cos\omega_M t_{go}}{\omega_T^2}\right) n_T + \left(\frac{\omega_M t_{go} - \sin\omega_M t_{go}}{\omega_M^3}\right) \dot{n}_T \quad (4)$$

However, known systems do not address how to estimate a target maneuver frequency ($\omega_T$) for the weaving target guidance law, and use small angle approximations.

U.S. Pat. No. 4,494,202 (Yueh), the disclosure of which is hereby incorporated by reference, describes a fourth order predictive augmented proportional navigation system terminal guidance design with missile attached target decoupling. In Yueh's system, the estimated value of target lateral displacement is derived from a representation of the measured LOS angle combined with radome error and noise in the system, and small angle approximations are used. The gain $C_3$ associated with a predetermined estimate of target maneuver augments the target acceleration term into a proportional navigation design. However, this gain is not adaptive, and relies on the target bandwidth (i.e., a predetermined value based on expected target maneuver). Thus, Yueh discloses an angular guidance approach which allows guidance for all line-of-sight (LOS) angles, yet maintains the conventional use of small angle approximation. Yueh does not support the framework for building a fully descriptive target state equation for adaptively estimating a target maneuver frequency in Cartesian space.

Warren, Price, Gelb and Vander Velder in "Direct Statistical Evaluation of Nonlinear guidance systems" AIAA Paper No. 73-836, which is incorporated herein by reference, disclose several missile guidance laws. In particular two optimal linear guidance laws C and D are shown that use Kalman filters which are synonymous with the classical optimal guidance control laws of Zarchan. Guidance law C minimizes the performance index, neglecting autopilot dynamics, resulting in $C_4=0$ and $C_3$ is a function of the target bandwidth, $\lambda_t$. Guidance law D is derived including the first-order autopilot model dynamics and the resulting n' and $C_4$ are both functions of $\lambda_m$ and $t_{go}$. The gains and navigation ratios for the Classical optimal guidance control laws of Warren et al., and Yueh are shown in Table 1.

TABLE 1

| | $C_3$ | $C_4$ | n' ($\gamma = 0$) |
|---|---|---|---|
| Law C | $\dfrac{e^{-X_T} + X_T - 1}{X_T^2}$ | 0 | 3 |

TABLE 1-continued

| | $C_3$ | $C_4$ | n' ($\gamma = 0$) |
|---|---|---|---|
| Law D | | $\dfrac{e^{-X_M} + X_M - 1}{X_M^2}$ | $\dfrac{6X_M^2(e^{-X_M} + X_M - 1)}{2X_M^3 + 3 + 6X_M^2 - 12X_M e^{-X_M} - 3e^{-2X_M}}$ | where: $X_T = \lambda_T \hat{t}_{go}$, $X_M = \lambda_M \hat{t}_{go}$; $\hat{t}_{go}$ = Estimated Time-to-Go [sec]
$\lambda_T$ = Target Maneuver Bandwidth [rad/sec]
$\lambda_M$ = Missile Autopilot/Airframe Bandwidth [rad/sec]
$\gamma$ = Optimal quadratic Cost Function Weighting Factor As with the systems disclosed by Zarchan, Yueh's system and those disclosed in Warren, are subject to the classical augmented proportional navigation problem, the zero or constant maneuver frequency assumptions, thus wasting valuable energy against highly maneuverable targets.

SUMMARY OF THE INVENTION

The present invention is directed to a system and method for adaptively guiding a moving device toward a maneuverable object. Exemplary embodiments include means for generating a guidance command signal from a vectored line-of-sight (LOS) between a device and an object using a position parameter of the object relative to a guidance frame, and an estimated object state produced in the guidance frame using the vectored line-of-sight; and means for transmitting the guidance command signal to an on-board guidance control of the device.

Exemplary embodiments include means for generating a signal representing a predicted position of the object from object position parameters relative to a guidance frame and periodically adaptive estimated object state produced in the guidance frame using the object position parameters; and, means for transmitting the signal to an on-board guidance control of the device.

BRIEF DESCRIPTION OF THE DRAWINGS

These and other features and advantages of the claimed subject matter will become more apparent from the detailed description and accompanying drawings, in which:

DETAILED DESCRIPTION OF INVENTION

Figure 1:
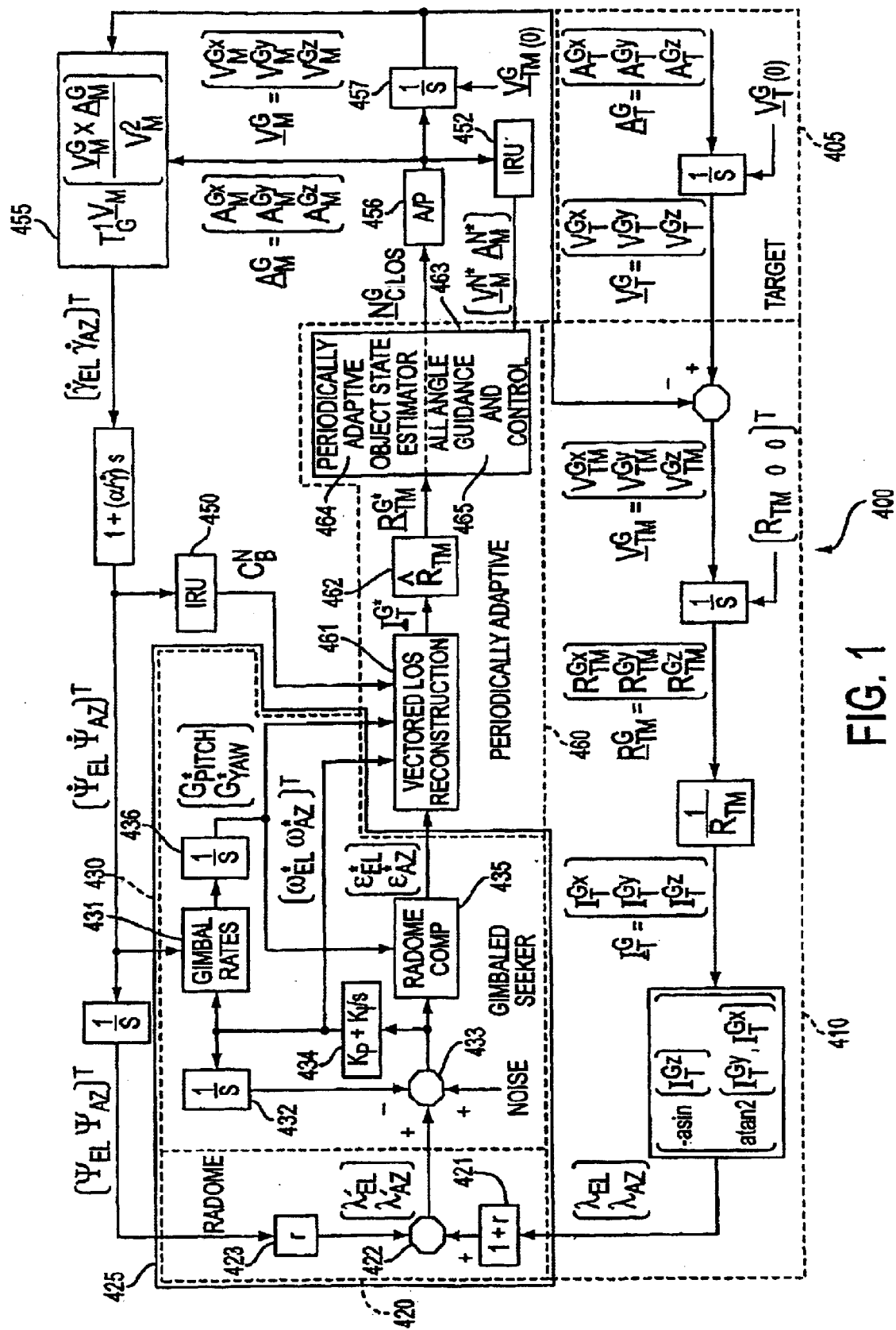
FIG. 1 is a periodically adaptive all angle guidance system in accordance with an exemplary embodiment of the present invention.

FIG. 1 shows a guidance system 400 for guiding a device toward an object according to an exemplary embodiment of the present invention.

The system 400 includes means 460 for generating a guidance command signal from a vectored line-of-sight (LOS) between a device and an object using a position parameter of the object relative to a guidance frame, and an estimated object state produced in the guidance frame using the vectored line-of-sight, and means 463 for transmitting the guidance command signal to an on-board guidance control of the device. The guidance command signal generating means can be configured using a single processor, computer or other electronic means, or via any number of processors, computers, etc., or combination thereof for implementing the function. The guidance command signal generating means can include means for creating a vectored line-of-sight (LOS) between the device and the object using the position parameter, generally represented as 461. The means for creating a vectored LOS can include LOS reconstruction. Line-of-sight reconstruction (LOS) provides an ability to have a fast missile autopilot time constant without causing guidance loop destabilization because of the relatively lower bandwidth of the seeker tracking control loop. Vectored LOS reconstruction is direction cosine rate integration of the seeker gyro rates and vector addition of the tracking errors. The result is a reconstructed target line-of-sight vector that is accurate for all LOS angles, thus creating an object line-of sight (LOS) in a guidance frame. Vectored LOS reconstruction combined with missile (IMU) information 450 transforms the target range, seeker gyro rates and tracking error measurements into a target-to-missile range measurement vector with components in a three-dimensional inertial guidance frame.

Estimated object states are produced relative to the guidance frame using a sequential object line-of-sight LOS. The estimated object state producing means is a periodically adaptive object state estimator represented by block 464, can include object state estimators with Kalman filters. Three-dimensional object state estimators are decoupled into three single dimension object state estimators that each operate independently on one of the range measurement vector components. The linear independent models describe the target-to-missile dynamics in each guidance frame axis. The three uncoupled object state estimators quickly and accurately adapt to the object acceleration frequency observed in each guidance frame axis by using a harmonically balanced multiple model Kalman filtering algorithm, as disclosed in "Multiple Model Adaptive Estimation and Prediction With The Harmonically Balanced Kalman Filter Bank", A Thesis Presented To The Faculty Of California State Polytechnic University, Pomona, by Randall Joseph Muravez, 1989 which is incorporated herein by reference. In addition, the three uncoupled periodically adaptive target state estimators and the multiple model Kalman filters within them can be executed in parallel to maximize processor throughput (i.e. digital array processing).

In the system 400, an interdependent group of variables (states) work together as a unified whole. The states of a system can be arbitrarily defined. The object states utilized in exemplary embodiments of periodically adaptive all angle guidance include range, velocity, acceleration and a further time derivative (i.e. acceleration rate).

The Means for creating guidance command signals using the estimated object state can include the implementation of various guidance and control laws. All Angle Guidance and Control 465 can include guidance command laws including All Angle Classical Pro Nav Guidance, Periodically Adaptive Guidance and All Angle Augmented Pro Nav Guidance which are applied to create guidance command signals perpendicular to the target LOS vector for all LOS angles, in order to null the angular rate of the target LOS vector with the missile acceleration commands.

A missile or device acceleration guidance command signal is fed to the missile autopilot 456 via wire or wireless means 463. The missile autopilot 456 communicates with the missiles inertial measurement unit (IMU) 450 as well as a propulsion system and/or control mechanism (i.e., aerodynamic control surfaces) of the interceptor (i.e., missile, device).

FIG. 1 also shows means for obtaining an object position parameter, generally 425. In an exemplary embodiment object position parameters are determined from target to seeker range and angular measurements.

"All Angle Guidance" means that for all possible target-to-missile line-of-sight angles, the guidance algorithms will perform accurately because vector algorithms are used to eliminate small angle approximations. Applying "All Angle Guidance" vector algorithms to current algorithms leads to higher probability of kill and lower missile agility requirements for all types of engagement geometries. An example of where "All Angle Guidance" vector algorithms can be required is for a short-range "dogfight" engagement where, the close proximity of the object and the interceptor create a dynamic environment were small angle approximations can be of no value. These algorithms can also be beneficial for the final aim-point portion of longer range engagements.

An all angle classical proportional navigation (pro nav) guidance law is derived by applying "All Angle" vector algorithms to Zarchan's classical pro nav guidance law of Equation (1) so that the missile acceleration command vector ($\underline{n}_c$) is always perpendicular to the target line-of-sight unit vector ($\underline{I}_T$):

$$\underline{n}_{c_{1LOS}} = N^i V_c [\underline{\dot{\lambda}} \times \underline{I}_T] = \left(\frac{N^i}{t_{go}^2}\right) \underline{I}_T \times \begin{bmatrix} x + \dot{x}t_{go} \\ y + \dot{y}t_{go} \\ z + \dot{z}t_{go} \end{bmatrix} \times \underline{I}_T \quad (5)$$

$$\text{where } \underline{I}_T = \left[\frac{R_{TM}}{R_{TM}}\right] \quad (6)$$

The closing velocity ($V_c$) and approximated time-to-go ($t_{go}$) are defined as $$V_c = -(\underline{V}_{TM}' \underline{I}_T) \quad (7)$$

$$t_{go} \cong (R_{TM}/V_c) \quad (8)$$

and the "All Angle" line-of-sight rate vector ($\underline{\dot{\lambda}}$) to be nulled is defined as:

$$\underline{\dot{\lambda}} = \frac{[\underline{R}_{TM} \times \underline{V}_{TM}]}{R_{TM}^2} \text{ where } \underline{R}_{TM} = \begin{bmatrix} x \\ y \\ z \end{bmatrix} \text{ and } \underline{V}_{TM} = \begin{bmatrix} \dot{x} \\ \dot{y} \\ \dot{z} \end{bmatrix} \quad (9)$$

The navigation gain (N') for the classical pro nav guidance law is typically a constant. The target-to-missile range and velocity vectors ($\underline{R}_{TM}$ and $\underline{V}_{TM}$) come from combining estimates from the three uncoupled target state estimators. The line-of-sight rate vector ($\underline{\dot{\lambda}}$) of the "All Angle" classical pro nav guidance law near the left-hand side of Equation (5) illustrates more intuitively that ($\underline{\dot{\lambda}}$) is to be nulled, and does not use the time-to-go approximation.

An all angle optimal augmented pro nav guidance law is derived from applying "All Angle" vector algorithms to Zarchan's scalar modern optimal augmented pro nav guidance law of Equation (2) so that the missile acceleration command vector ($\underline{n}_c$) is always perpendicular to the target LOS unit vector $\underline{I}_T$:

$$\underline{n}_{c_{1LOS}} = N^i V_c [\underline{\dot{\lambda}} \times \underline{I}_T] + \left(\frac{N^i}{t_{go}^2}\right) [\underline{I}_T \times \underline{ZEM}_{TM} \times \underline{I}_T] - C_4 \underline{n}_L \quad (10)$$

$$\text{where } \underline{ZEM}_{TM} = 0.5 t_{go}^2 \underline{n}_T = 0.5 t_{go}^2 \begin{bmatrix} n_{TX} \\ n_{TY} \\ n_{TZ} \end{bmatrix} \quad (11)$$

The relationship shown in Equation (4) is used to keep the classical pro nav part of the new law intact as function of $\underline{\dot{\lambda}}$, which is more intuitive and does not use the time-to-go ($t_{go}$) approximation of Equation (3). Zarchan's modern navigation gain (N') and the achieved missile acceleration quantity ($C_4$ $\underline{n}_L$) that optimally make-up for the expected dynamics lag in the missile autopilot remain unchanged. The classical guidance augmentation using estimated target acceleration ($\underline{n}_T$) is presented in Equation (11) as the zero effort miss vector ($\underline{ZEM}_{TM}$) caused by a constant target maneuver. An important enhancement of the new law in Equation (10) is the application of two cross-products to $\underline{ZEM}_{TM}$ using the target line-of-sight unit vector ($\underline{I}_T$). This results in properly applying the $\underline{ZEM}_{TM}$ augmentation so as to always be perpendicular to the target LOS unit vector $\underline{I}_T$.

Thus, the "All Angle Guidance" law of Equation (10) can lead to higher probability of kill and lower missile agility requirements for all types of engagement geometries.

Another feature used in accordance with exemplary embodiments is "Periodically Adaptive Guidance." This means that the target acceleration frequency (spiraling, weaving, none) is periodically adaptively estimated and used to successfully improve missile guidance. The result can lead to higher probability of kill and lower missile divert requirements for a wide range of maneuvering targets.

A periodically adaptive guidance law is derived from improved prediction of $\underline{ZEM}_{TM}$ based on probability weighted multiple models of different target maneuver frequencies and their target acceleration and acceleration rate states as described for one dimension in "Multiple Adaptive Estimation and prediction with the harmonically balanced Kalman Filter Bank":

$$ZEM_{TM} = \begin{bmatrix} \sum_{m=1}^{NMB} C_{3m}^{Gx}\hat{A}_{Tm}^{Gx} + C_{3'm}^{Gx}\hat{\mathring{A}}_{Tm}^{Gx} \\ \sum_{m=1}^{NMB} C_{3m}^{Gy}\hat{A}_{Tm}^{Gy} + C_{3'm}^{Gy}\hat{\mathring{A}}_{Tm}^{Gy} \\ \sum_{m=1}^{NMB} C_{3'm}^{Gz}\hat{A}_{Tm}^{Gz} + C_{3'm}^{Gz}\hat{\mathring{A}}_{Tm}^{Gz} \end{bmatrix} \quad (12)$$

where $C_{3m}^{G} = \underline{W}_m^G \Phi_{13m}^{PCA}(\hat{t}_{go})$, $C_{3'm}^{G} = \underline{W}_m^G \Phi_{14m}^{PCA}(\hat{t}_{go})$ $$\text{where } \underline{W}_m = \begin{bmatrix} W_{Xm} \\ W_{Ym} \\ W_{Zm} \end{bmatrix}, \hat{A}_{Tm}^{G} = \begin{bmatrix} \hat{A}_{Tm}^{Gx} \\ \hat{A}_{Tm}^{Gy} \\ \hat{A}_{Tm}^{Gz} \end{bmatrix}, \hat{\mathring{A}}_{Tm}^{G} = \begin{bmatrix} \hat{\mathring{A}}_{Tm}^{Gx} \\ \hat{\mathring{A}}_{Tm}^{Gy} \\ \hat{\mathring{A}}_{Tm}^{Gz} \end{bmatrix} \text{ and} \quad (13)$$

$$\begin{bmatrix} \Phi_{13m}(t_{go}) \\ \Phi_{14m}(t_{go}) \end{bmatrix} = \begin{bmatrix} \Phi_{13}(t_{go}, \omega_{Tm}, T_{Cm}) \\ \Phi_{14}(t_{go}, \omega_{Tm}, T_{Cm}) \end{bmatrix} \quad (14)$$

$$\Phi_m^{PCA}(\tau) = \begin{bmatrix} 1 & \tau & \Phi_{13m}^{PCA}(\tau) & \Phi_{14m}^{PCA}(\tau) \\ 0 & 1 & \Phi_{23m}^{PCA}(\tau) & \Phi_{24m}^{PCA}(\tau) \\ 0 & 0 & \Phi_{33m}^{PCA}(\tau) & \Phi_{34m}^{PCA}(\tau) \\ 0 & 0 & \Phi_{43m}^{PCA}(\tau) & \Phi_{44m}^{PCA}(\tau) \end{bmatrix} \quad (15)$$

$$\Phi_{13m}^{PCA}(\tau) = (\Phi_{Bm} + \Phi_{Am}\tau_S) + (e^{-\lambda_{Tm}\tau}\sin(\omega_{Tm}\tau + 3\theta_m))/(\omega_{Nm}\omega_{Tm})) \quad (16)$$

$$\Phi_{23m}^{PCA}(\tau) = \Phi_{Am} - (e^{-\lambda_{Tm}\tau}\sin(\omega_{Tm}\tau + 2\theta_m)/\omega_{Tm}]$$

$$\Phi_{33m}^{PCA}(\tau) = e^{-\lambda_{Tm}\tau}\cos(\omega_{Tm}\tau) + \lambda_{Tm}\Phi_{34m}^{PCA}(\tau)$$

$$\Phi_{43m}^{PCA}(\tau) = -\omega_{Nm}^2 \Phi_{34m}^{PCA}(\tau)$$

$$\Phi_{14m}^{PCA}(\tau) = (\tau - \Phi_{23m}^{PCA}(\tau))/\omega_{Nm}^2$$

$$\Phi_{24m}^{PCA}(\tau) = (1 - \Phi_{33m}^{PCA}(\tau))/\omega_{Nm}^2$$

$$\Phi_{34m}^{PCA}(\tau) = e^{-\lambda_{Tm}\tau}\sin(\omega_{Tm}\tau)/\omega_{Tm}$$

$$\Phi_{44m}^{PCA}(\tau) = \Phi_{33m}^{PCA}(\tau) - 2\lambda_{Tm}\Phi_{34m}^{PCA}(\tau)$$

where:

$$\theta_M = \mathrm{atan2}(\omega_{Tm}, \lambda_{Tm}) \quad (17)$$

$$\omega_{Nm}^2 = \lambda_{Tm}^2 + \omega_{Tm}^2$$

$$\Phi_{Am} = 2\lambda_{Tm}/\omega_{Nm}^2$$

$$\Phi_{Bm} = (1 - (4\lambda_{Tm}^2/\omega_{Nm}^2))/\omega_{Nm}^2$$

As indicated in FIG. 1, the multiple model probability weighting vectors ($\underline{W}_m$) defined in Equations (12) and (13) originate from the periodically adaptive target state estimators that are based on multiple model Kalman filtering. The probability weighting vectors ($\underline{W}_m$) indirectly represent a three-dimensional estimate of the target maneuver frequency $\omega_t$ and its correlation time constant $T_{Cm}$. The probability weighting vectors ($\underline{W}_m$) contain weights, wherein the sum of the probability weights for any axis of the guidance frame is unity, and they uniquely make the "Periodically Adaptive Guidance" law of Equation (12) periodically adaptive.

As shown in Equation (12) using the vector definitions of Equations (13) and (14), the $m^{th}$ Kalman filter model's estimated target acceleration and acceleration rate state vectors ($\hat{\underline{A}}$ and $\hat{\underline{\mathring{A}}}$) are multiplied by the $m^{th}$ model's state transition elements $\Phi_{13m}(t_{go})$ and $\Phi_{14m}(t_{go})$. Then they are multiplied by the probability weighting vectors $\underline{W}_m$ and summed over the total number of models in the Kalman filter bank (NMB). The $m^{th}$ model's state transition elements $\Phi_{13m}(t_{go})$ and $\Phi_{14m}(t_{go})$ are time-to-go predictive coefficients based on an $m^{th}$ model's a priori hypothesis of expected target maneuver frequency ($\omega_{tm}$) and its correlation time constant ($T_{cm}$). The state transition elements are presented in equations (13) and (14), their derivation is shown in "Multiple Model Adaptive Estimation and Prediction with the harmonically Balanced Bank".

The $m^{th}$ model state transition elements are obtained using equations (15) through (17), with the variables $\lambda_{Tm}$ and $\omega_{Tm}$ established through parameterization of the harmonically balanced Kalman filter bank. To periodically adaptively estimate states of a maneuvering target, it is desired to adapt to a constant acceleration target ($T_C \approx T_c$max [Sec], $\omega_M = 0$ [R/S]), to a constant velocity target ($T_C \approx 0.2$ [Sec], $\omega_M = 0$ [R/S]), and to a jinking or other type of maneuvering target ($T_C$=unknown [Sec], $\omega_M$=unknown [R/S]). The common parameterization design approach is to determine each Kalman filter's dynamical parameters by discretizing a continuous parameter space, which is accomplished by dispersing a set of dynamical parameter vectors [$d_1 \ldots d_{NMB}$] throughout a region of reasonable parameter vector values.

Figure 2:
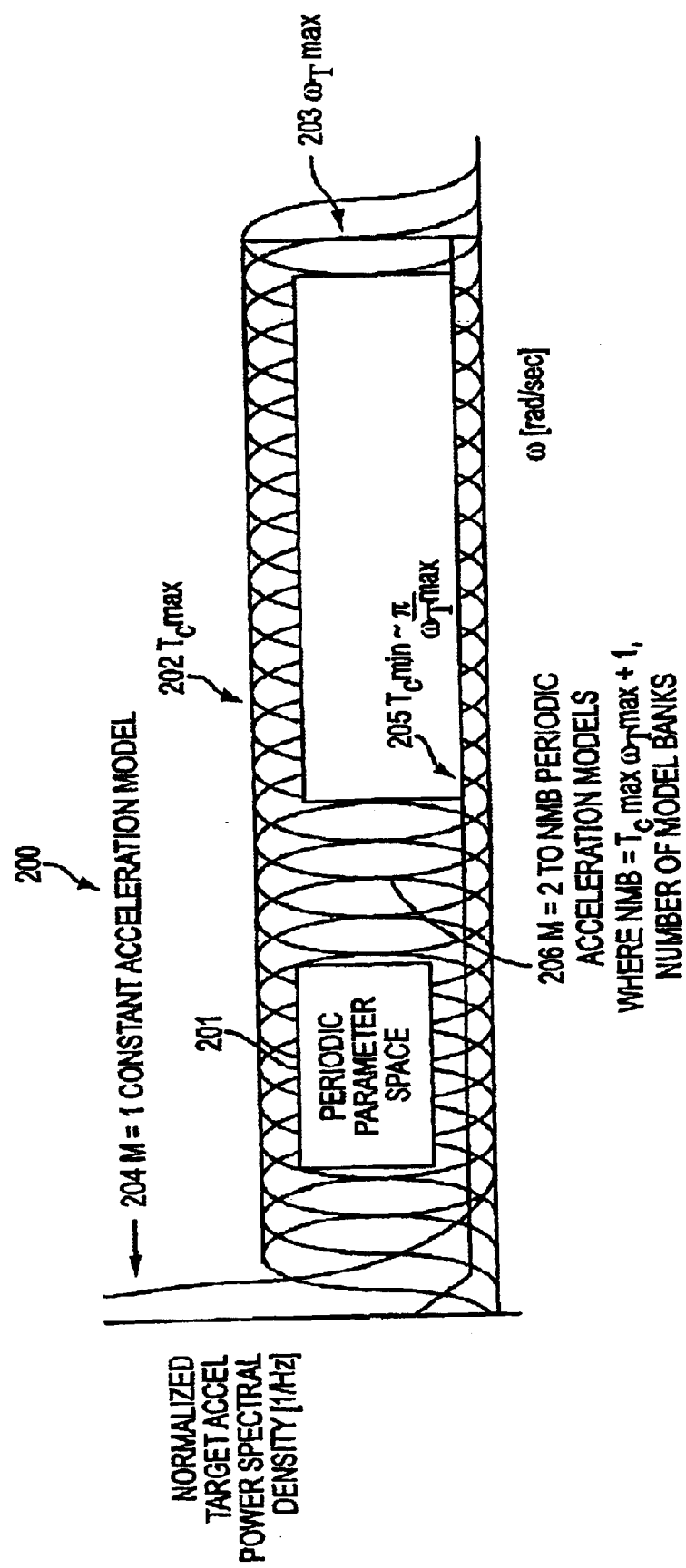
FIG. 2 is representation of normalized target acceleration power spectral density of a harmonically balanced Kalman filter bank in accordance with an exemplary embodiment of the present invention.

FIG. 2 shows an exemplary harmonically balanced Kalman filter bank model 200. The parameterization of the "harmonically balanced Kalman filter bank," shown in FIG. 1, is accomplished with the $m^{th}$ periodic dynamical parameter vector $d_m$ shown by Equation 18:

$$d_m = \begin{bmatrix} \lambda_{Tm} \\ \omega_{Tm} \end{bmatrix} \quad (18)$$

where $\lambda_{Tm} = m^{th}$ model target bandwidth, and $\omega_{Tm} = m^{th}$ model target maneuver frequency.

A hypothesis set of periodic dynamical parameter vectors is split into two parts:

$$[d_m]_{NMB} \triangleq [d_1 \ldots d_{NMB}] \quad (19)$$
$$= [d_1 [d_m]_{2:NMB}]$$

where $$[d_m]_{2:NMB} \triangleq [d_2 \ldots d_{NMB}]$$

The first dynamical parameter vector $d_1$ defines the highly time-correlated "zero-frequency" system dynamics hypothesis model. For Periodically Adaptive Guidance Control, $d_m$ at m=1 defines the constant target acceleration hypothesis, shown in equation (20):

$$d_1 = \begin{bmatrix} \lambda_{T1} \\ \omega_{T1} \end{bmatrix} = \begin{bmatrix} \frac{1}{4 \times T_C MAX \text{ [Sec]}} \\ 0.01 \text{[R/S]} \end{bmatrix} \quad (20)$$

where $T_C$MAX [Sec] is the maximum periodic system dynamics time constant. The remaining set of the periodic parameter vectors $[d_m]_{2:NMB}$ encompass a periodic parameter space 201 bounded by $T_C$MAX, shown as line 202 and the maximum system dynamics maneuver frequency $\omega_T$MAX represented as line 203. The periodic parameter space 201 with these maximum boundaries is the domain of the normalized PCA power spectral density function. Each periodic parameter vector included in $[d_m]_{2:NMB}$ has an identical balanced maximum time constant $T_CMAX$ [Sec] or damping coefficient, which is equal to $2/T_CMAX$ [1/Sec]. And, each periodic parameter vector is harmonically separated by a constant half-power bandwidth: $1/T_CMAX$ [Rad/Sec]. Therefore, the parameterization design of the "harmonically balanced Kalman filter bank" is completed with the following set of periodic dynamical parameter vectors:

$$[d_m]_{2:NMB} = \begin{bmatrix} \lambda_{Tm} \\ \omega_{Tm} \end{bmatrix}_{2:NMB} = \begin{bmatrix} \dfrac{1}{T_CMAX} \text{ [Sec]} \\ \dfrac{[m-1]}{T_CMAX} \text{ [Rad/Sec]} \end{bmatrix}_{2:NMB} \quad (21)$$

The total minimum number of parameter hypothesis models in the "harmonically balanced Kalman filter bank" (NMB) is simply a "periodic parameter space area" bounded by the maximum periodic dynamical parameters $T_CMAX$ [Sec], and $\omega_TMAX$ [Rad/Sec], plus one hypothesis model shown as line 204 based on the "zero-frequency" dynamical parameter vector $d_1$,:

$$NMB = \omega_T MAX \, T_C MAX + 1 \quad (22)$$

and models based on $d_m$; m=2 to NMB are represented generally in FIG. 2 as waveforms 206.

The maximum periodic parameters $T_CMAX$ and $\omega_TMAX$ are specified based on a designer's discretion for a particular application. As a result, many arrangements of the "harmonically balanced Kalman filter bank" are possible from the laws of Eqs. (20) and (21).

The minimum time constant $T_CMIN$, shown as line 205, is defined as the height of an "equally weighted" harmonically balanced PCA spectral density function, which is a band limited white noise acceleration or constant velocity model with minimum correlation time constant $T_CMIN$, similar to an ideal low-pass filter. The minimum system dynamics time constant for the "harmonically balanced Kalman filter bank" is inversely proportional to the maximum system dynamics maneuver frequency:

$$T_C MIN \approx \dfrac{\pi}{\omega_T MAX} \text{ [Sec]} \quad (23)$$

The other maximum periodic parameter, the maximum maneuver frequency $\omega_TMAX$, is bounded by the maximum realistically expected target maneuver frequency for a particular target based on a priori knowledge. In addition, $\omega_TMAX$ should be maximized according to Eq. (23) so as to minimize the target acceleration time constant $T_CMIN$ for adequately describing a constant velocity target.

The "Periodically Adaptive Guidance" law of Equation (12) can improve missile guidance. As the estimated target maneuver frequency gets higher, the probability weighted state transition elements cause the estimated target acceleration and acceleration rate states to have less affect on the zero effort miss due to a target maneuver. This is reflected in physics: an acceleration sine wave of frequency $\omega$ that is twice integrated affects its position magnitude by $1/\omega^2$. Thereby, the zero effort miss of Equation (12) used to augment the "All Angle Guidance" law of Equation (10) will be smaller for higher target maneuver frequencies. For lower target maneuver frequencies the opposite is true, and for zero frequency or constant target acceleration, the zero effort miss due to a target maneuver becomes the classical augmentation of Equation (11). Additionally for a non-maneuvering constant velocity target, the probability weighting vectors can become equally weighted and can successfully cancel out the augmentation.

Thus, the "Periodically Adaptive Guidance" law of Equation (12) can lead to higher probability of kill and lower missile divert requirements for a wide range of maneuvering targets.

1. System Integration

FIG. 1 is a simplified block diagram of a guidance system in accordance with an exemplary embodiment of the present invention. FIG. 1 also shows means for obtaining object position parameters as used in exemplary embodiments.

The target's actual velocity and acceleration vectors within the guidance frame are shown as $\underline{V}^G_T$ and $\underline{A}^G_T$ and are shown in the target portion of the diagram 400. Vectors are generally represented with a capital letter that is underlined. The reference frame associated with vectors is a superscript to the right of the vector, for example $\underline{V}^G$ is a velocity vector in the G reference frame. Measured parameters are indicated with a "*" and subscripts are used to associate the parameter with an object, for example $\underline{V}^{G*}_t$ is a measured velocity vector associated with a target. A "^" over a scalar or a vector indicates an estimated value and a "˙" indicates a rate, for example $\dot{\hat{R}}$ the estimated change of the range with respect to time.

The relative geometry of the target in relationship to the missile is shown in the relative geometry portion 410 of the diagram where the $\underline{V}^G_{TM}$ represents the closing velocity in vectored form between the missile and the target. Subsequently, the range vector are $\underline{R}^G_{TM}$ represents the end state miss distance between the target and the missile in vector form and $\underline{l}^G_T$ represents the target LOS vector. The target LOS angles $\lambda_{el}$ and $\lambda_{az}$ are the actual azimuth and elevation angles from the missile to the target. The description of the relative geometry is merely a representation of the physical dynamics of the target with respect to the guidance frame and the missile. This portion of FIG. 1 need not be performed by the guidance system, but serve as a representation for illustrative purposes.

In the radome portion of the diagram $\lambda_{el}$ and $\lambda_{az}$ are operated on by block 421 [1+r], where r is the radome slope error. The modified LOS angles are combined at 422 with representation of $\Psi_{el}$ and $\Psi_{az}$ which are the missile body axis angles with respect to the guidance frame, multiplied by r, the radome slope error in block 423. The output of the combiner 422 is a measurement of the LOS in $\lambda'_{el}$ and $\lambda'_{az}$ which is forwarded to the Gimbaled seeker 430. Radome compensation is addressed in U.S. Pat. No. 3,316,549. The Gimbaled seeker track loop has Gimbal rates as an input which are the rates of change obtained from a rate gyro of the angle between the antenna axis and the missile axis. The gyro rates $\omega_{el}^*$, $\omega_{az}^*$ are integrated in block 432 and the integration is applied to the output of the radome $\lambda'_{el}$ and $\lambda'_{az}$. The combination results in $\epsilon_{el}$, $\epsilon_{az}$, which are the angles between the missile to target LOS and the electrical bore sight or track errors. The track errors are multiplied by the track loop gain in block 434 and that quality along with the gyro rates are applied to the integrator 432 to complete the loop. The track errors are also multiplied in block 435 to compensate for the radome, resulting in $\epsilon_{el}^*$ and $\epsilon_{az}^*$. These compensated track errors are inputs to the periodically adaptive all angle guidance system. The Gimbal rates in 431 are integrated in block 436 and used to compensate the track errors and serve as input to the periodically adaptive all angle guidance system 460. The seeker track errors $\epsilon_{el}^*$ and $\epsilon_{az}^*$ have radome compensation and target body aim point corrections. The gimbal rates, derived from the body rates $\psi_{el}$ and $\psi_{az}$, are integrated resulting in gimbal angles $G_{pitch}^*$ and $G_{yaw}*$, they are applied as inputs to the radome compensation 435 and into the periodically adaptive all angle guidance and control system 460. An inertial reference unit (IRU) 450, the same as IRU 452, is transformed through a transformation matrix $C^n{}_b$ into the inertial navigation frame and supplied to the periodically adaptive all angle guidance and control system 460.

The output of the periodically adaptive all angle guidance and control system 460 results in a missile acceleration guidance command vector in the inertial guidance frame $\underline{n}^G{}_{c_lLOS}$ which is transmitted at 463 as an input to the missile's autopilot 456. The autopilot generates an acceleration vector which is integrated in block 457 to represent a velocity vector. The acceleration and velocity vectors are fed into a transformation block 455 which yields flight path rates and eventually body rates. Body angles $\Psi_{el}$ and $\Psi_{az}$, and the velocity and acceleration vectors of the missile are functions external to the control system. These are not part of the actual mechanism of the guidance system and only facilitate to derive a representative input to the internal reference unit (IRU) and the radome. Periodically adaptive all angle guidance and control system 460 is represented as blocks in FIG. 1, vectored LOS reconstruction 461 which supplies $\underline{I}^G{}_t*$ which is reconstructed LOS vector measurement of the range between the target and the missile relative to a guidance frame. Block 462 creates an estimate of the range $\hat{R}_{tm}$ from the target which when multiplied by the reconstructed LOS vector becomes a range vector $\underline{R}^{G*}{}_{tm}$ in the guidance frame. This input is received by the periodically adaptive object state estimators 464 and all angle guidance and control block 465, both of which receive input from IRU located in the missile. Other such systems with radome, seekers and autopilots can be used in conjunction with the periodically adaptive guidance as described above.

Vectored LOS reconstruction 461 with a gimbaled seeker as well as with an electrically steered seeker, the periodic adaptive control and periodically adaptive target state estimation are now discussed in greater detail.

2. Vectored LOS Reconstruction

Figure 3:
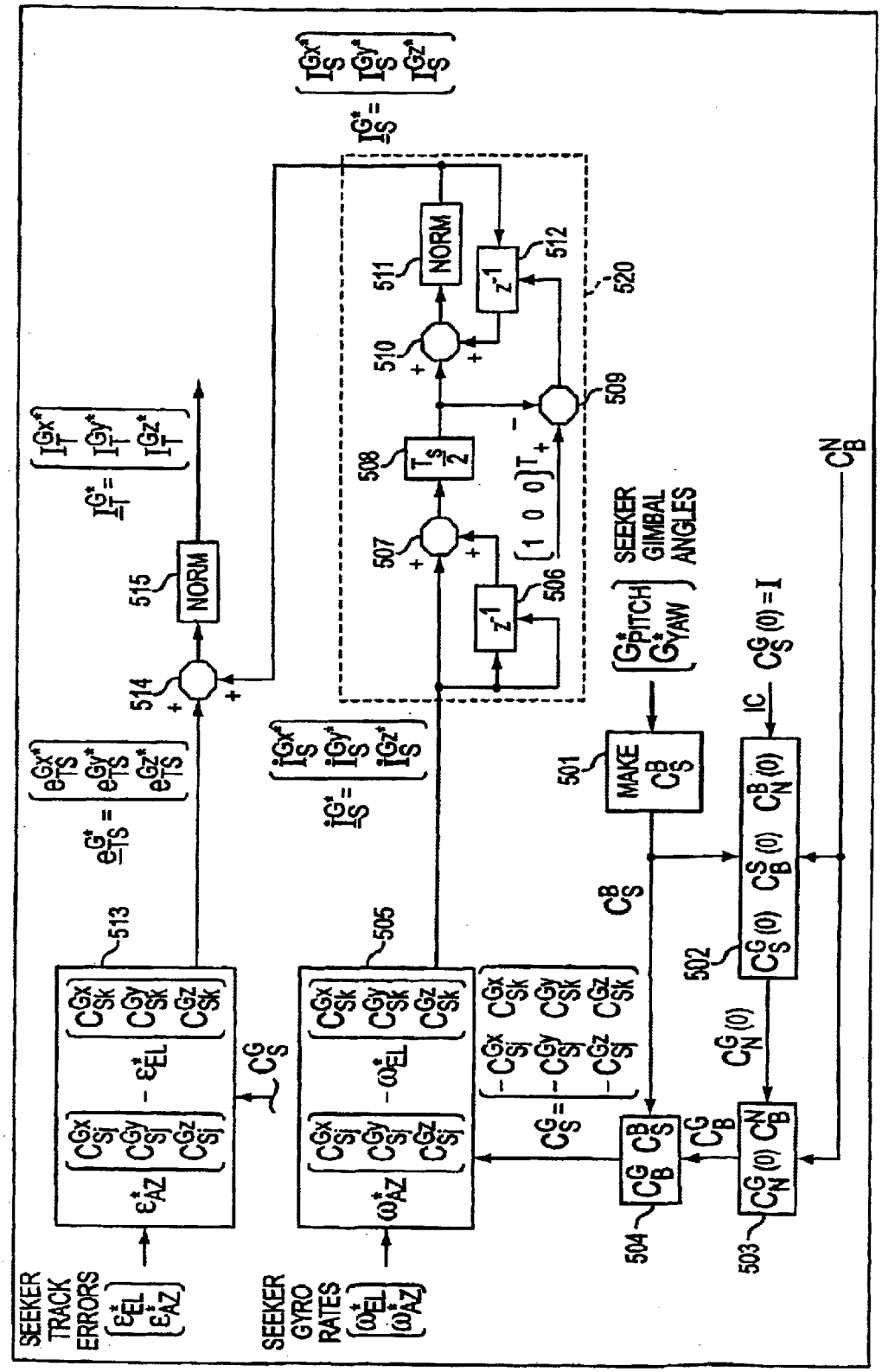
FIG. 3 is a block diagram of Vectored LOS reconstruction for a Gimbaled seeker in accordance with an exemplary embodiment of the present invention.

A simplified diagram of a means for creating a vectored LOS in a guidance frame from an object position parameter is presented in FIG. 3. In particular FIG. 3 shows vectored LOS reconstruction with a gimbaled seeker. The inputs to the vectored LOS reconstruction can include the seeker track errors $\epsilon^*{}_{el}$ and $\epsilon^*{}_{az}$, seeker gyro rates $\omega^*{}_{el}$ and $\omega^*{}_{az}$ and the IRU missile body to inertial navigational frame transformation matrix $C^n{}_b$, as well as the seeker Gimbal angles $G^*{}_{pitch}$ and $G^*{}_{yaw}$. From the $G^*{}_{pitch}$ and $G^*{}_{yaw}$, a transformation vector $C^B{}_s$ from the missile body frame to the seeker bore sight frame is constructed in block 501. This transformation matrix is applied in block 502 along with the missile body to inertial navigation frame transformation matrix $C^G{}_B$ and an identity matrix I which equals the transformation matrix of the seeker to the inertial guidance frame at the initial condition of t=0. The output of block 502 is a transformation matrix at t=0 of the inertial navigation frame to the inertial guidance frame.

The transformation matrix $C^g{}_n(0)$ operates on the $C^n{}_b$ matrix in block 503 resulting in a transformation matrix from the missile body to the inertial guidance frame $C^G{}_B$. This transformation matrix operates on the transformation matrix $C^B{}_s$ in block 504 to form matrix $C^G{}_s$ which is the seeker bore sight frame to the guidance frame transformation matrix. The matrix $C^G{}_s$ operates on the seeker gyro rates $\omega^*{}_{el}$ and $\omega^*{}_{az}$ in block 505 forming the inertial seeker boresight direction cosine rate vector $\underline{I}^{G*}{}_s$. The matrix $C^G{}_s$ also operates on the seeker track errors $\epsilon^*{}_{el}$ and $\epsilon^*{}_{az}$ forming a target end point to seeker boresight error vector $\underline{e}^{G*}{}_{ts}$.

The direction cosine rate factor $\underline{I}^{g*}{}_s$ undergoes inertially referenced trapezoidal integration in block 520. The integration within blocks 506 and 512 are accomplished using Z transforms in that $\underline{I}^{G*}{}_s$ is not a continuous function and thus lends itself more readily to the Z transformations. The output of the trapezoidal integration is the inertial seeker boresight vector $\underline{I}^{G*}{}_s$ which is combined with the error vector $\underline{e}^{G*}{}_{ts}$ at combiner 514. The resultant vector is normalized in block 515 to form a target aim point LOS vector $\underline{I}^{G*}{}_t$ with the magnitude of 1, in other terms a unit vector. Referring to FIG. 1 at block 462, a range estimate independently calculated is then applied to the LOS vector $\underline{I}^{G*}{}_t$ to obtain the range vector $\underline{R}^{G*}{}_{tm}$. The range vector and the IRU of the interceptor are used in the periodically adapted estimation and control.

Figure 4:
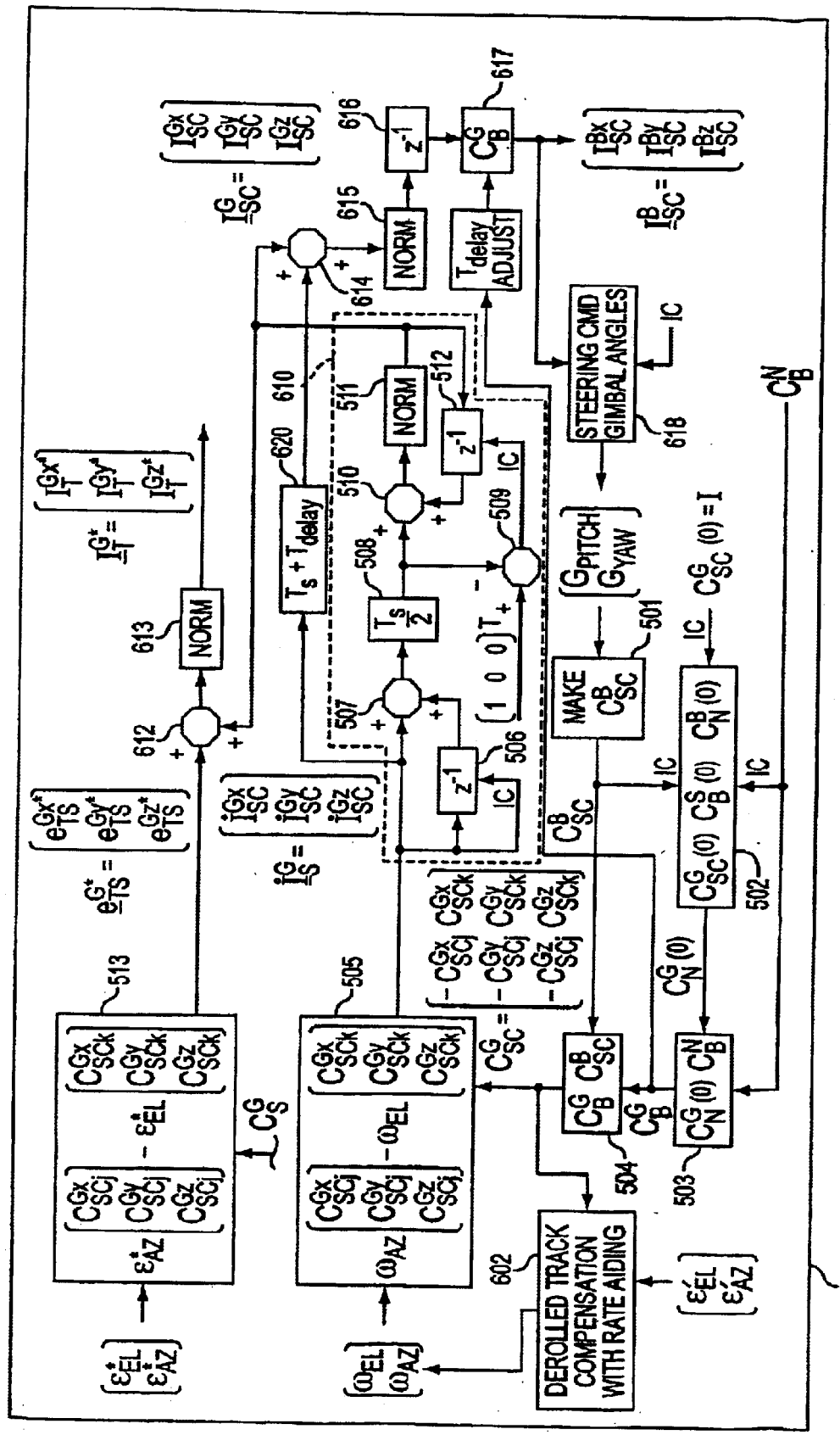
FIG. 4 is a block diagram of Vectored LOS reconstruction for an electronically steered seeker in accordance with an exemplary embodiment of the present invention.

Alternative means for creating a vectored LOS in a guidance frame from an object position parameter using vectored LOS reconstruction is shown in FIG. 4 as a simplified schematic wherein the seeker is electronically steered. The vectored LOS reconstruction with an electronically steered seeker is similar to the LOS reconstruction with the gimbal seeker, thus only differences of note will be discussed. Whereas in the gimbal seeker, gyro rates and gimbal angles are supplied as inputs, with an electronically steered seeker, these inputs are generated within the LOS reconstruction. However, the uncompensated seeker track errors remain as inputs to the electronically steered seeker LOS reconstruction.

The seeker beam steering command space rates are generated in a control loop in which these uncompensated seeker track errors $\epsilon_{el}$ and $\epsilon_{az}$ are combined with the transformation matrix $C^g{}_{sc}$ between the seeker beam steering command and the guidance frame in block 602. This track compensation with rate aiding results in the steering command space rates $\omega_{cl}$ and $\omega_{az}$. $\underline{I}^G{}_{sc}$ is integrated in an inertially referenced trapezoid integration process 610 resulting in $\underline{I}^G{}_{sc}$ the inertial seeker beam's steering command vector. The vector $\underline{I}^G{}_{sc}$ is then added at 612 to the target aim point to seeker beam center error vector $\underline{e}^{G*}{}_{ts}$, normalized and results in the target aim point LOS vector $\underline{I}^{G*}{}_t$. The seeker beam steering command vector $\underline{I}^G{}_{sc}$ is further added at 614 to $\dot{\underline{I}}^G{}_{sc}$ operated on by $[T_s+T_{delay}]$ in box 620. The resultant vector is normalized 615, integrated 616, and multiplied 617 by the transformation vector $C^G{}_b$ which results in the seeker beam steering command vector in missile body frame $\underline{I}^B{}_{fc}$ which functions on the steering command gimbal angles in block 618 generating the pitch and yaw angles $G_{pitch}$ and $G_{yaw}$. Other functions shown in FIG. 4 perform similar to their counterparts in the gimbaled seeker and are references as such.

3. Periodically Adaptive Guidance

Figure 5:
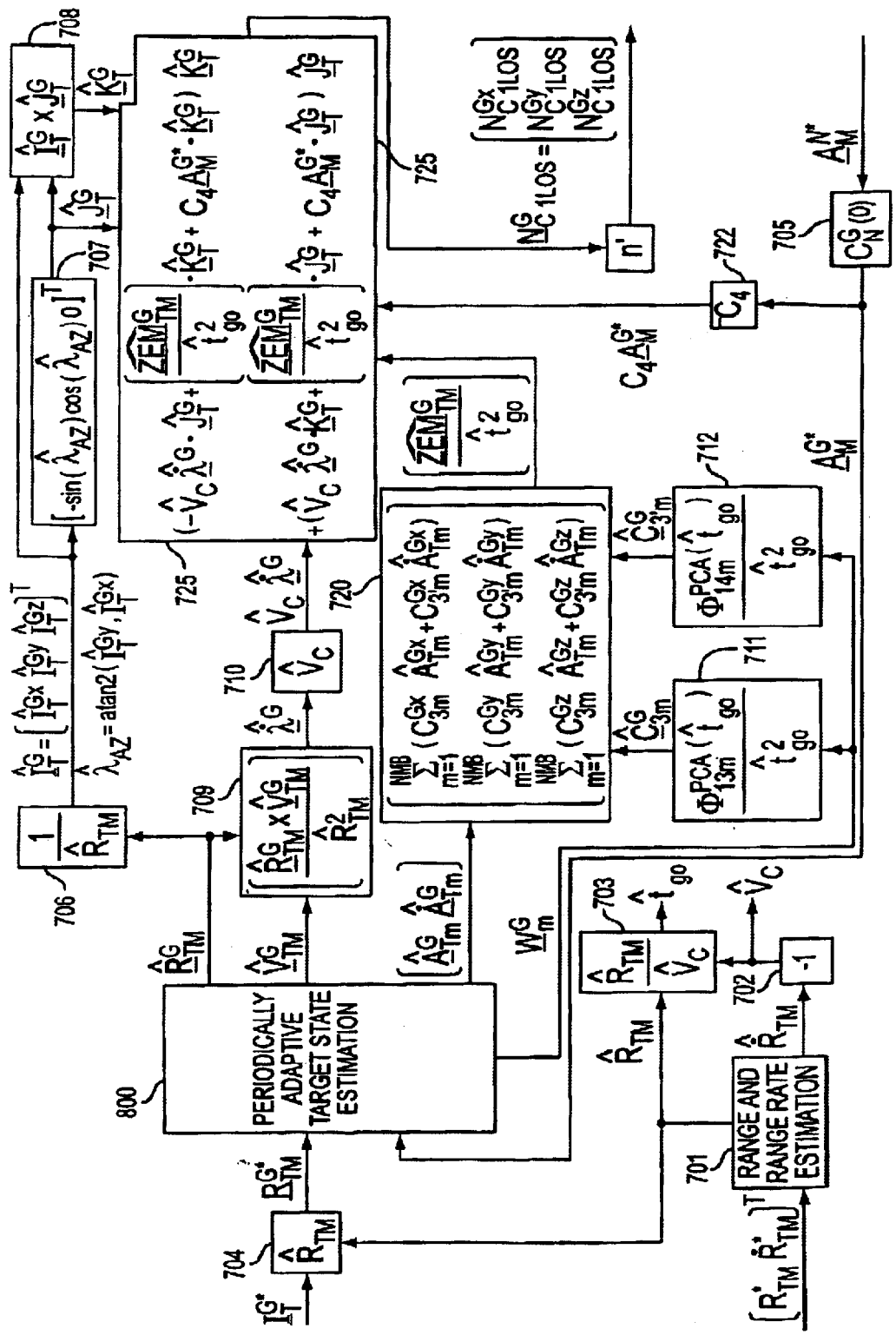
FIG. 5 is a block diagram of a periodically adaptive guidance system in accordance with an exemplary embodiment of the present invention.

Means for generating a guidance command signal using estimated object states utilizing an exemplary periodically adaptive guidance and control system is shown on FIG. 5. The inputs to the guidance system are the reconstructed LOS vector $\underline{I}^{G*}{}_t$, the seeker range and range rate measurements are $R^*{}_{tm}$, $\dot{R}^*{}_{tm}$, and IRU missile acceleration vector in an inertial navigation frame $\underline{A}^{n*}{}_m$. In block 701, from the range and range rate measurements an estimate is made of range and range rate. The range rate $\dot{\hat{R}}_{Tm}$ is operated on by block 702 resulting in $\hat{V}_c$, the estimated closing velocity. The estimated range, $\hat{R}_{Tm}$ is divided by $\hat{V}_c$ in block 703 to obtain the estimated time-to-go, or time to intercept $\hat{t}_{go}$. The means for generating a guidance command signal uses sequential line-of-sight (LOS) vectors in the guidance frame, in that the estimated range $\hat{R}_{Tm}$ is multiplied in block 704 by the LOS unit vector to obtain the range vector $\underline{R}^{G*}{}_{tm}$. The IRU missile acceleration vector in inertial navigation frame, $\underline{A}^{N^*}_m$, is applied to a transformation matrix in block 705 in order to obtain the missile acceleration vector $\underline{A}^{G^*}_M$ in the inertial guidance frame. The periodically adaptive target state estimation in block 800 receives $\underline{R}^{\tilde{g}^*}_{tm}$ and $\underline{A}^{G^*}_m$ as inputs. As a result of the periodically adaptive target state estimator 800, the means for generating a guidance command signal is periodically adaptive.

The target state estimation result in four target state vectors as well as a $m^{th}$ model probability weighing vector $\underline{W}^G_m$. The target state variables can be the estimated target to missile range vector $\hat{R}_{Tm}{}^G$, the estimated target to missile velocity vector $\hat{V}_{Tm}{}^G$ and two target acceleration state vectors $\hat{A}_{Tm}{}^G$ and $\mathring{A}_{Tm}{}^G$. The weighing vector is represented as $\underline{W}^G_m$. The estimated range vector is divided by the estimated range in block 706 to obtain a estimated LOS vector $\hat{1}_T{}^G$, the estimated LOS vector is reduced into its constituents parts forming an estimated $\underline{J}^G{}_T$ vector in the guidance frame and an estimated $\underline{K}^G{}_T$ vector, both vectors being mutually perpendicular and formed in blocks 707 and 708 respectively. The estimated target to missile velocity vector is crossed by the estimated target to missile range vector and divided by the square of the scalar estimated range in block 709 thus resulting in an estimated target line-of-sight angular rate vector $\dot{\hat{\lambda}}^G$ which is multiplied by the estimated closing velocity scalar $\hat{V}_C$ in block 710. The target acceleration state vectors $\hat{A}_{Tm}{}^G$ and $\mathring{A}_T{}^G$ are multiplied by the $m^{th}$ model periodically adaptive control vector gains $C_{G3m}$ and $C^G{}_{3'm}$, and summed over the number of banks in block 720, the control vector gains are determined from the $m^{th}$ model probability Weight vector $\underline{W}^G_M$ in block 711 and 712. $\Phi_{13m}(t_{go})$ and $\Phi_{14m}(t_{go})$ are derived in the previously mentioned master's thesis.

The gains and navigation ratios associated with the exemplary periodically Adaptive guidance control system are shown in Table 2. The gains $C^G{}_{3m}$ and $C^G{}_{3'm}$ are used as the $C_3$ gains disclosed in prior art systems discussed previously. Laws $C_{PA}$ and $D_{pa}$ are associated with laws C and D respectively, but contained periodically adaptive gains.

TABLE 2

| | $\underline{C}_{3m}{}^G$ | $\underline{C}_{3'm}{}^G$ |
|---|---|---|
| Law $C_{PA}$ | $\dfrac{\Phi^{PCA}_{13m}(\hat{t}_{go})}{\hat{t}^2_{go}}\begin{pmatrix}W^{Gx}_m\\W^{Gy}_m\\W^{Gz}_m\end{pmatrix}$ | $\dfrac{\Phi^{PCA}_{14m}(\hat{t}_{go})}{\hat{t}^2_{go}}\begin{pmatrix}W^{Gx}_m\\W^{Gy}_m\\W^{Gz}_m\end{pmatrix}$ |
| Law $D_{PA}$ | | | where:

$\underline{W}^G_m = (W^{Gx}_M \ W^{Gy}_m \ W^{Gz}_m)^T$ = Multiple Model Probability Weighting Vectors in Inertial Cartesian Guidance Frame $\hat{t}_{go}$ = Estimated-Time-to-Go [sec]

$(\Phi^{PCA}_{13m}(\tau) \ \Phi^{PCA}_{14m}(\tau))$ = Harmonically Balanced Multiple Model PCA State Transition Matrix Elements The periodically Adaptive Guidance Control system can include, as seen in exemplary embodiments, a gain $C_4$ in block 722 to compensate for autopilot lag, but is not required.

The result of the periodically adaptive control calculation of block 720 is an estimated zero effort miss vector $\underline{Z\hat{E}M}_{tm}{}^G$ divided by the time to go squared $(\hat{t}_{go})^2$. The missile acceleration vector in an inertial guidance frame $\underline{A}^{G^*}_m$ is subject to a gain in block 722 of $C_4$, similar to classical optimal control theories discussed previously. The LOS component vectors $\underline{J}^G{}_t$, $\underline{K}^G{}_t$, the quantity $\hat{V}_c$ and $\dot{\hat{\lambda}}^G$, the Zero effort miss vector $\underline{Z\hat{E}M}_{tm}$ divided by $(\hat{t}_{go})^2$ and the missile acceleration vector multiplied by the gain $C_4$ combine in block 725 to obtain a missile guidance acceleration command vector $\underline{N}^G{}_C$ in the inertial guidance frame which is perpendicular to the LOS. A close look at the equation terms in block 725, reveals the means for generating a guidance command signal comprises a proportional navigation controller, a classical optimal controller and an augmented proportional navigational controller. The coefficient $\hat{V}_c \cdot \dot{\hat{\lambda}}^G$ originates from proportional navigational control theory. The coefficient $C_4 \cdot \underline{A}^{G^*}_m$ represents the acceleration command that compensates for autopilot lag which is synonymous with classical Optimal Proportional Navigation Guidance. The $\underline{Z\hat{E}M}_{tm}$ vector divided by time-to-go squared $(\hat{t}_{go})^2$ is similar to the augmented acceleration command vector and is the predominate periodic adaptive guidance portion. The resultant missile guidance acceleration command signal is a vector that is perpendicular to the LOS vector $\hat{1}_t{}^G$ thus the significance of the "skid to turn" missile maneuver term can be seen.

4. Target State Estimation

Figure 6:
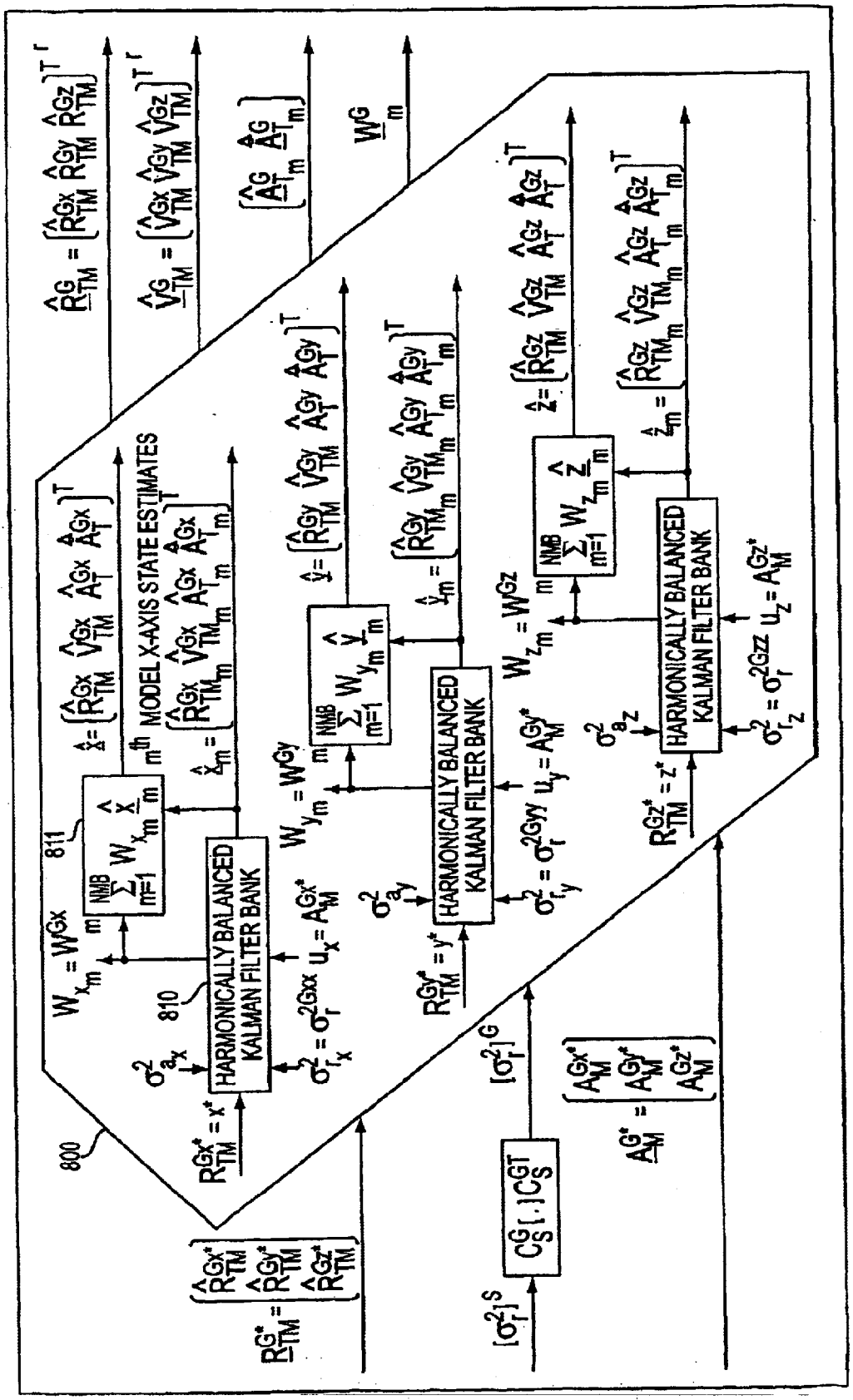
FIG. 6 is a block diagram of a three dimensional periodically adaptive target state estimation system.

Means for estimating object states according to an exemplary periodically adaptive target state estimation system referred to here before in general terms is shown in greater detail in FIG. 6. The inputs to the periodically adaptive target state estimation system are the reconstructed LOS vector, $\underline{R}^{G^*}_{tm}$, a seeker measurement error of variance matrix transform from seeker boresight frame to inertial guidance frame $[\sigma^2_r]^G$ and the IRU missile acceleration vector n inertial guidance frame $\underline{A}^{G^*}_m$. The target state estimation is carried out in each of the three axis independently. To be periodically adaptive, the means for generating a guidance command signal has at least one Kalman filter bank, to be periodically adaptive, the bank is harmonically balanced, and each of the at least one Kalman filter banks 810a, 810b and/or 810c is associated with a respective axis x, y and/or z in the guidance frame G. Although FIG. 6 shows the estimation of these target state variables for each of the three axis, for description purposes only the x axis will be discussed as the process is identical for each axis in the guidance frame.

The harmonically balanced Kalman filter bank 810a receives the X component of $R^{G^*}_{tm}$ and designated as $\hat{R}^{GX^*}$, the expected X axis target acceleration variance $\sigma^2_{ax}$ and the X component of the seeker measurement error variance matrix in the inertial guidance frame $\sigma^2_{RX}$ and the IRU missile acceleration vector and inertial frame $A^{Gx}_m$. In generating a guidance command signal, the Harmonically Balanced Kalman filter Bank 810 is a means for generating a set of probability weights. An output of the harmonically balanced Kalman filter bank 810 is the $m^{th}$ model X axis probability weights $W^{Gx}_m$ and the $m^{th}$ model X axis state estimates $\hat{X}_m$ which comprises the vector $\hat{R}_{TMm}{}^{GX^*}$, $\hat{V}_{TMm}{}^{GX}$, $\hat{A}_{Tm}{}^{GX}$ and $\mathring{A}_{Tm}{}^{GX}$. The means for generating a guidance command signal creates an estimated object to device range vector, an estimated object to device velocity vector, an estimated object acceleration vector and an estimated object acceleration rate vector, these vectors are representative of the object or target states shown in FIG. 5. The summation in block 811 of the product of $W^{Gx}_m$ and $\hat{X}_m$ where m=1 to number of banks, results in the X axis state estimate $\hat{X}$ which includes $\hat{R}_{TM}{}^{GX^*}$, $\hat{V}_{TM}{}^{GX}$, $\hat{A}_T{}^{GX}$, $\mathring{A}_T{}^{GX}$.

The combination of all three dimensions, results in an output of the periodically adaptive estimated states of an estimated target-to-missile range vector $\hat{R}_{TM}^G$, an estimated target-to-missile velocity vector $\hat{V}_{TM}^G$ and the $m^{th}$ model estimated target acceleration state vectors $\hat{A}_T^G$ and $\hat{\mathring{A}}_T^G$ also containing three components associated with the axis of the guidance frame. Additionally, the $m^{th}$ model probability weighing vector $\underline{W}_m^G$ is provided. It is noteworthy to mention that each axis state estimates can be generated independently and congruently.

5. Harmonically Balanced Kalman Filter Banks

Kalman filtering theory models the system using Gaussian distributed random noise disturbances. The Kalman filter is a real-time computer algorithm that estimates system states with a recursive two step process. Kalman filters predict system states expected at the next measurement input time using a priori knowledge of the missile-target dynamic model, and it corrects the predicted object states with noise corrupted measurements of the system.

Figure 7:
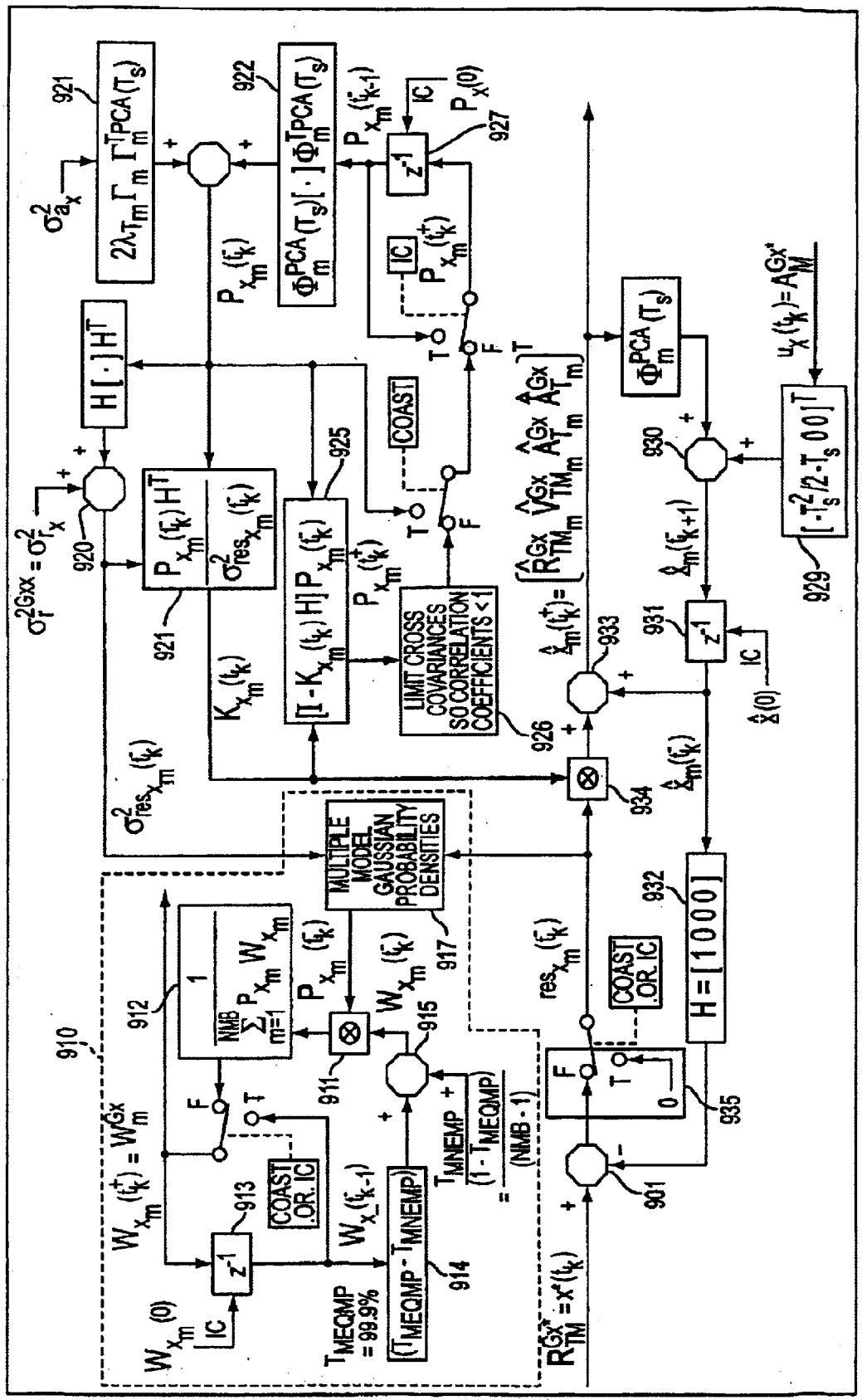
FIG. 7 is a block diagram of a harmonically balanced Kalman filter bank in accordance with an exemplary embodiment of the present invention.

A simplified block diagram of an exemplary harmonically balanced Kalman filter in the X axis is presented in FIG. 7. Other harmonically balanced Kalman filter banks for the Y and Z axis are performed similarly.

A Bayesian hypothesis probability calculator is represented in the diagram as area 910. The inputs to the Bayesian hypothesis calculator are σ res $X_m(t_K)$ which is the multiple model X axis residual variances which is matrix of constants, the derivation of which is well known to those skilled in the art. Res $X_m(t_K^+)$, the multiple X axis residuals also serves as inputs. An $m^{th}$ model Kalman filter with the "correct" system dynamics hypothesis model can be expected to have minimized residuals compared to other "mismatched model" $m^{th}$ model Kalman filters. From these two inputs, a multiple model of Gaussian probability density distribution is created at block 917. The measurement probability density of the $m^{th}$ filter in the multiple model bank is a Gaussian distribution, in that the Kalman filter theory depends on the system modeling with Gaussian probability density distributions.

Throughout FIG. 7, $(t_K^-)$ is the unconditioned result of a prediction estimate while $(t_K^+)$ is the conditioned prediction estimate. The multiple model Gaussian probability density 917 is multiplied by the multiple model X axis probability weights in block 911. The result is then normalized in block 912 by dividing the product of the $m^{th}$ model Gaussian probability density with the $m^{th}$ model X axis probability weight from one to the number of filter banks (NMB). The result is a multiple model X axis probability weight that has been conditioned.

The multiple model $W_{Xm}$ probability weights are integrated in block 913 using a Z transformation with $W_{Xm}(0)$ being the initial condition for the transformation. The $m^{th}$ model X axis probability at $(t_{K-1}^-)$ which is unconditioned is multiplied by the transition probability matrix $T_{MEQMP}$ in block 914. $T_{MEQMP}$ is the transition probability of the true system dynamical parameters not changing during sample time interval and is set at 99.9%. $T_{MNEMP}$ is the transition probability of true system dynamical parameters changing during a sample time interval and includes all values where $T_{MNEMP}$ is not equal to $T_{MEQMP}$. The formulation of this matrix and it's use in Bayesian hypothesis probability is known and documented as the adaptive learning theory of Moose and Wang entitled "An adaptive estimator with learning for a plant containing Semi-Markov switching parameters," by R. L. Moose and P. P. Wang, IEEE Transactions on Systems, Man, and Cybernetics, vol. 3, (May 1973): 277–281, which is herein incorporated by reference.

The matrix is summed with $T_{MNEMP}$ in block 915 which results in the multiple model X axis probability weight $W_{Xm}(t_K^-)$ which is the unconditioned result of prediction estimates. The use of the transitional probability matrix allows the bank of harmonically balanced Kalman filters to move from weights =0 to weights >0.

The X axis missile acceleration measurement $U_X(t_K)$ is multiplied by L $[-T_s^2/2, -T_s, 0, 0]^T$ in block 929 and added to the PCA state transition matrix $\Phi_m^{PCA}(T_s)$ where $T_s$ is the sample time in block 930 to form the deterministic input $\hat{X}_m(t_k+1)$. The deterministic input is integrated to form $\hat{X}_m(t_k-)$ through a Z transformation in block 931. The initial input into the Z transform is the initial condition of X at T=0. The result is multiplied by the H vector which is the system measurement matrix shown in block 932 and subtracted from the X axis range vector $X^*(t_k)$ in block 901. The result of this addition are multiple model X axis residuals, $\text{res}_{Xm}(t_K^-)$, which continues the loop as input to the multiple model Kalman probability function of block 917 and are summed in block 934 along with a multiple model X axis Kalman gain matrix $K_{Xm}(t_K)$. This combination added to $\hat{X}_M(t_K^-)$ at 933 supplies $X_m(t_k^+)$ which is a multiple model X axis state estimate.

The expected X axis target acceleration variance $\sigma_{ax}^2$ is multiplied by 2 $\lambda_{Tm}$ which reflects the plant noise and $\Gamma_m\Gamma_m^{TPCA}(T_s)$ in block 921 and added to the covariance propagator in block 922. The result is the multiple model X axis covariance matrices $P_{Xm}(t_K^-)$ which is thereafter multiplied by the transpose of the transition matrix H and divided by the, residual variances $\sigma_{\text{res}\ Xm}^2(t_K^-)$ in block 921. The result is the multiple model X axis Kalman gain matrix $K_{Xm}(t_K)$ which is applied to block 925 which conditions the multiple model X axis covariance matrices. The conditioned multiple model X axis covariance matrices are submitted to block 926 to limit the cross variance, so that the correlation of coefficients is <1. Covariance limiting is required to eliminate singularities in the multiple model X axis covariance matrices. The result is integrated in block 927, by a Z transformation, and multiplied in block 922 to form covariance propagation.

When an initial condition is true as in block 935, no residue is created as the path is broken, however the propagation of the multiple model X axis covariance matrices $P_{Xm}$ continues for multiple time periods $T_s$. The result of this process is $\hat{X}_m(t_K+)$ which is a multiple model X axis state estimate. The harmonically balanced multiple model PCA noise covariance input matrix $\Gamma_m\Gamma_m^{TPCA}(T_S)$ is digitally precomputed from the equation (24).

$$\Gamma_m\Gamma_m^{TPCA}(T_s) = + \int_0^{T_1} \Phi_m^{PCA}(\tau) G_m G_m^T \Phi_m^{TPCA}(\tau) d\tau \qquad (24)$$

where $G_m = [0\ 0\ 1\ (\omega_{Nm} - 2\lambda_{Tm})]^T$

It is important to note that $T_s$ is a fixed sample time in seconds. Thus the Bayesian hypothesis estimator the covariance propagator, the Kalman matrices and the multiple model target state estimates result in the multiple model X axis state estimates $\hat{X}_m(T_k)$, which is conditioned.

The expected X-axis target acceleration variance $\sigma_{ax}^2$ is shown in the top left hand corner of FIG. 7. This is a constant that is selected using the generalized knowledge of the target and is constant within the velocity frame. Multiple $\sigma_{ax}^2$ can be used depending upon the type and nature of the target encountered. An independent system or operator input can be used to evaluate and select from a plurality of established $\sigma_{ax}^2$ based on a priori knowledge of the specific targets.

Figure 8A:
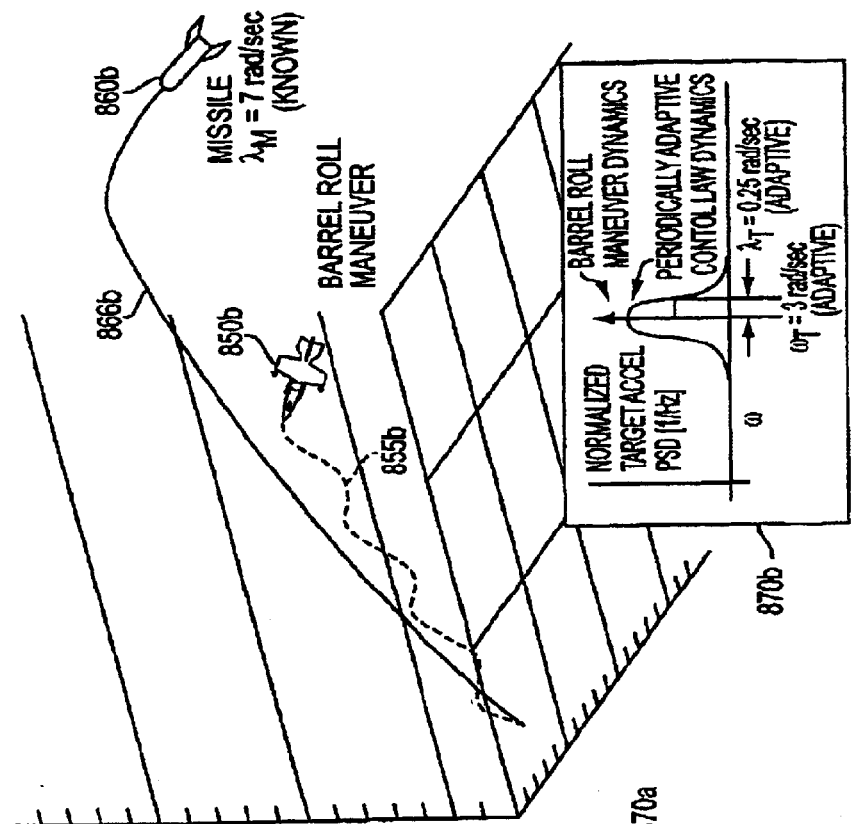
FIGS. 8a–8b are representative paths and power spectral density charts for a missile intercepting a target according to Classical Optimum Control and Periodically Adaptive Control, respectively, in accordance with exemplary embodiments of the present invention.

FIG. 8a is a representation of a flight path 866a of a missile 860a intercepting a target 850a, executing a barrel roll maneuver flight path 855a, using an exemplary embodiment of vectored LOS reconstruction and Classical Optimal Guidance Control. The figure demonstrates the guidance control systems ability to engage in high boresight angle engagements. The Classical Optimal Guidance Control results in the missile mimicking the targets flight path with an expenditure of additional energy. The Figure also contains an insert 870a which is the target acceleration power spectral density plot.

The coverage of classical optimal control law dynamics is shown where the object (target) bandwidth $\lambda_T$ is one radian per second and the normalized target acceleration has a frequency of $\omega_T=0$, both of which are assumed from a priori knowledge of the target. The barrel roll maneuver at $\omega_T=3$, is outside the response capability of the classical optimal control law dynamic, the consequence, as shown in FIG. 8a, being the intercepting device 860a mimics the target's path 855a as seen the Figure.

Figure 8B:
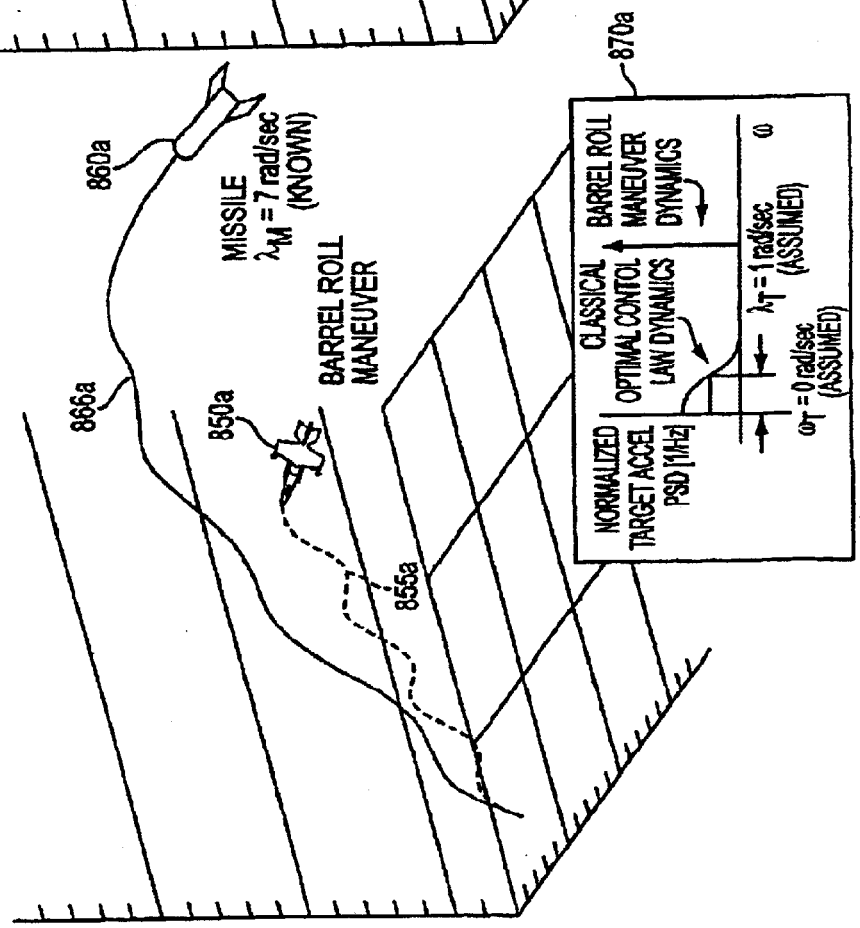

FIG. 8b represents a flight path 866b of a missile 860b intercepting a target 850b, executing a similar maneuver along flight path 855b, using an exemplary embodiment of Periodically Adaptive Guidance Control. The figure demonstrates the Periodically adaptive guidance control system's ability to adapt to the maneuver frequency of the target and minimize the necessity to match the periodic maneuvers of the target. The periodically adaptive guidance control system can reduce energy consumption during intercept as well as required missile agility. The Figure also contains an insert 870b which is the target acceleration power spectral density plot.

The periodically adaptive control law dynamics as seen in FIG. 870b, encompasses the barrel roll maneuver frequency $\omega_T=3$ within a small bandwidth 0.25 rads per second. The periodically adaptive capability allows the system to adapt to varying target acceleration frequencies. Thus the control system can respond robustly to the periodic barrel roll or other periodic maneuvers. The its resultant missile path shown as 866b.

Figure 9A:
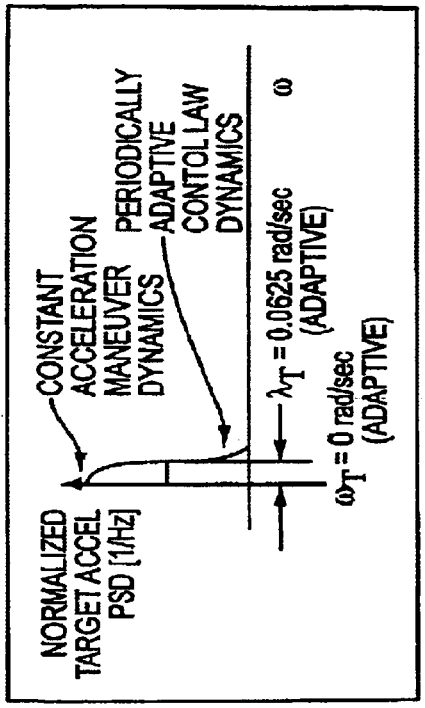
FIGS. 9a–9d are exemplary response capability diagrams produced using periodically adaptive all angle guidance for a periodic maneuver target, a constant acceleration target, a time varying jinking target, and a constant velocity target, respectively.

FIG. 9a shows a periodically adaptive control law dynamic of an exemplary embodiment. This Figure is reproduced from FIG. 8b such that the adaptive dynamic nature of the present invention can be illustrated when view alongside FIG. 9b–FIG. 9d.

Figure 9B:
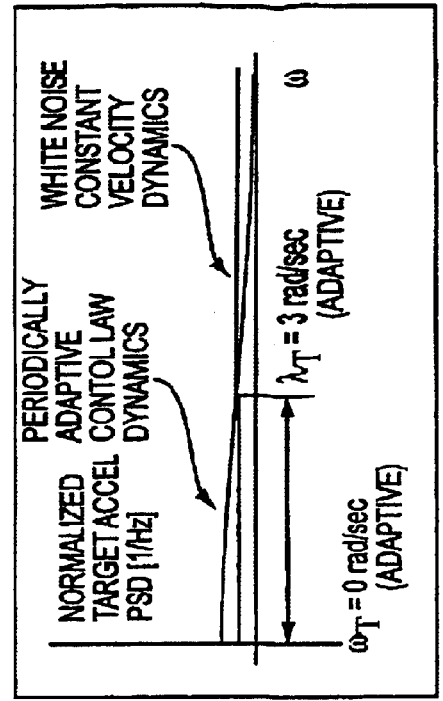

FIG. 9b is a representation of the bandwidth response capability for a constant maneuver target where the maneuver frequency $\omega_T=0$. The classical optimal control dynamics can encompasses the constant acceleration maneuver dynamics of the target, since it is within the assumed bandwidth. FIG. 9b shows that the periodically adaptive control dynamics can effectively encompass the target acceleration frequency of the constant maneuver target.

Figure 9C:
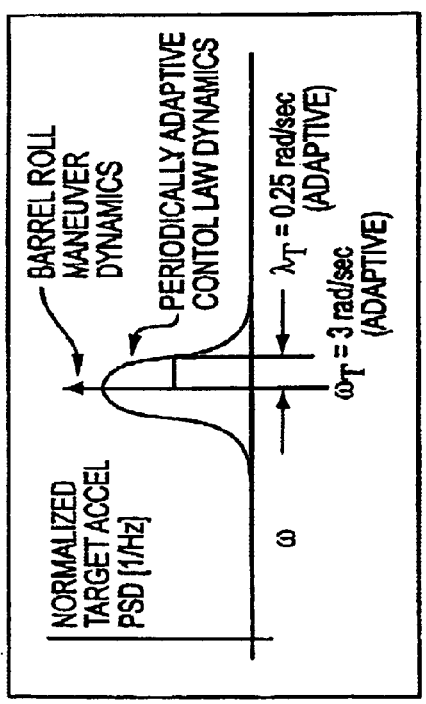
Figure 9D:
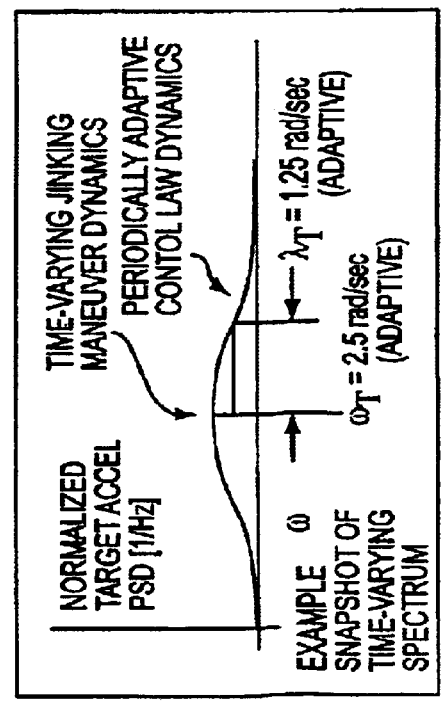

An overlap in the classic optimal control law dynamics response bandwidth can occur for a jinking target. However, as the bandwidth of the target maneuver jinking dynamics increases, the effectiveness of the classical optimal control dynamics is reduced. FIG. 9c is a target acceleration power spectral density plot for periodically adaptive control against a time varying jinking target. FIG. 9c demonstrates that the periodically adaptive control dynamics response bandwidth adapts to encompass the bandwidth and frequency of the target. The same is true of FIG. 9d where a constant velocity target is presented.

As is evident in FIGS. 9a–9d, the periodically adaptive control dynamics response bandwidth of the present invention readily adapts to target maneuvers that arc periodic with a frequency greater than zero. In the case of constant acceleration, constant maneuver and jinking maneuver, the periodically adaptive control system demonstrates a capability at least equal to those of a classical optimal guidance system. Therefore, in addition to handling target maneuvers in which the classical optimal guidance system is well formed, exemplary embodiments of the present invention can handle a periodic maneuver, such as the barrel roll maneuver used by aircraft pilots for evasive maneuvers, or the tumbling of intercontinental ballistic missiles upon their reentry.

Figure 10:
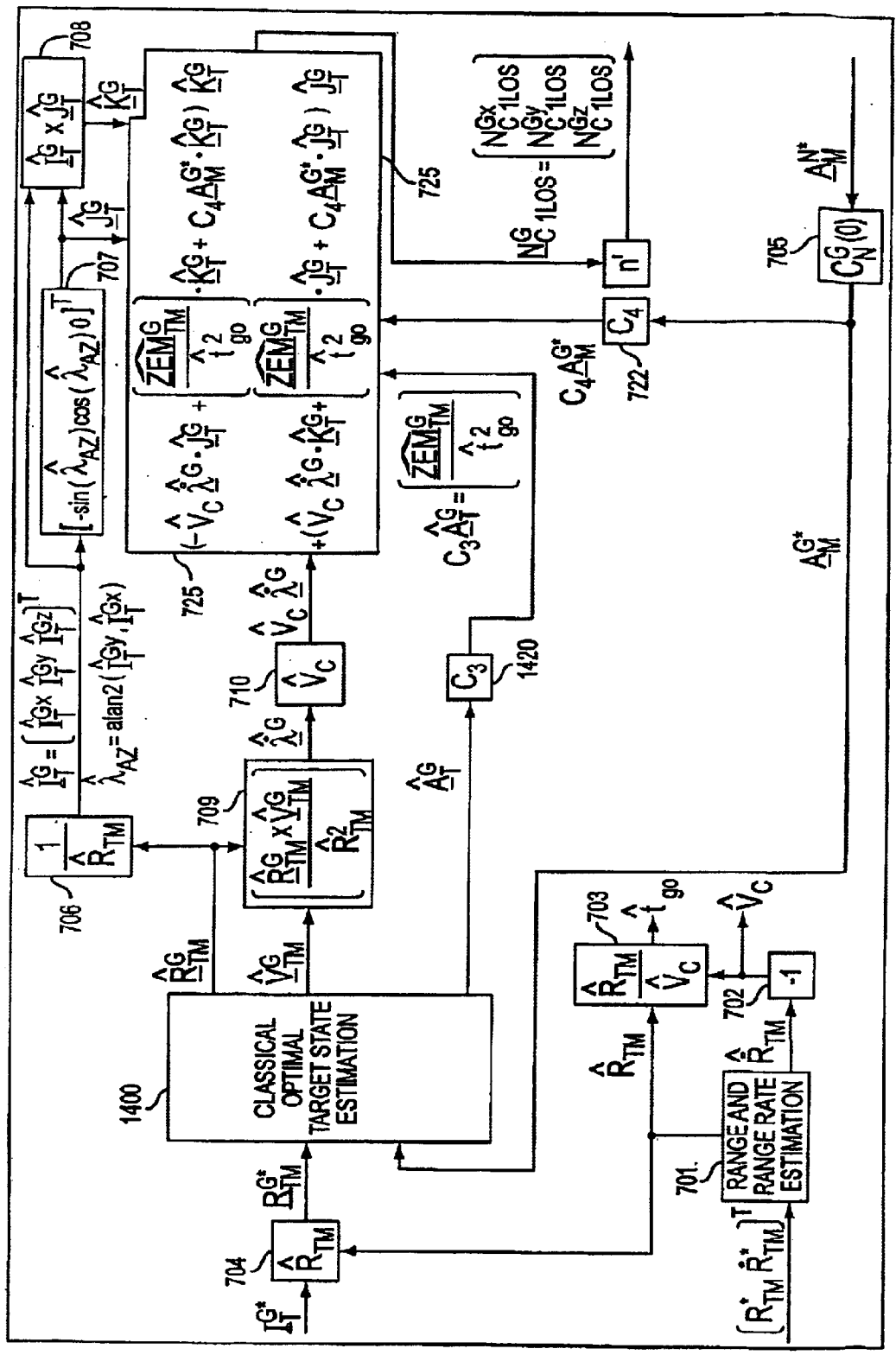
FIG. 10 is a block diagram of a guidance system with LOS and range vectors in accordance with an exemplary embodiment of the present invention.

An exemplary embodiment utilizing alternate means for determining a guidance command using estimated object state with classical optimal guidance is presented in FIG. 10. Classical optimal all angle guidance shares similar components and operations with exemplary embodiments of periodically adaptive all angle guidance system discussed with respect to FIG. 5 and are referenced accordingly, with the notable exception of periodically adaptive object state estimation and periodically adaptive control.

The inputs to the guidance system are the reconstructed LOS vector $\mathbf{I}^{G^*}_t$, the seeker range and range rate measurements are $R^*_{tm}$, $\dot{R}^*_{tm}$, IRU missile acceleration vector in an inertial navigation frame $\underline{A}^{n^*}_m$. In block 701, from the range and range rate measurements an estimate is made of range and range rate. The range rate $\hat{\dot{R}}_{tm}$ is operated on by block 702 resulting in $\hat{V}_c$, the estimated closing velocity. The estimated range, $\hat{R}_{tm}$ is divided by $\hat{V}_c$ in block 703 to obtain the estimated time-to-go, or time to intercept $\hat{t}_{go}$. The estimated range $\hat{R}_{tm}$ is multiplied in block 704 by the LOS unit vector to obtain the range vector $\underline{R}^{G^*}_{tm}$. The IRU missile acceleration vector in inertial navigation frame $\underline{A}^{N^*}_m$ is applied to the transformation matrix in block 1405 in order to obtain the missile acceleration vector $\underline{A}^{G^*}_M$ in the inertial guidance frame. The classical optimal target state estimation function in block 1400 is well known in the art and it particulars are not further developed. The classical optimal target state estimation function 1400 receives $R^{g^*}_{tm}$ and $A^{G^*}_m$ as inputs.

In an exemplary embodiment, means for estimating object states result in three target state vectors. The target state variables are the estimated target to missile range vector $\hat{\underline{R}}_{tm}^G$, the estimated target to missile velocity vector $\hat{\underline{V}}_{tm}^G$ and the estimated target acceleration state vector $\hat{\underline{A}}_{tm}^G$. The estimated range vector and velocity vectors are processed in the same manners previously discussed regarding FIG. 5, resulting in an estimated $\underline{J}^G$ vector in the guidance frame $\hat{\underline{J}}_t^G$ and an estimated $\underline{K}^G$ vector $\hat{\underline{K}}_t^G$, and an estimated target LOS angular rate vector $\hat{\lambda}^G$ which is multiplied by the estimated closing velocity scalar $\hat{V}_C$ in block 710. The target acceleration state vector $\hat{A}_t^G$ is multiplied by gain $C_3$ at block 1420 where $C_3$ is a function of $\lambda_T$ and $t_{go}$, as shown in equation (25) where $\lambda_T$ is a predetermined target bandwidth based on priori knowledge.

$$C_3 = \frac{e^{-X_T} + X_T - 1}{X_T^2} \tag{25}$$

where $X_T = \lambda_T \hat{t}_{go}$ $\lambda_T$ = Target Maneuver Bandwidth

The result of this gain in block 1420 is an estimated zero effort miss vector $\hat{ZEM}_{tm}^G$ divided by the time-to-go squared $\hat{t}_{go}{}^2$. The missile acceleration vector in an inertial guidance frame $\underline{A}^{G*}{}_m$ is subject to a classical optimal control theory gain of $C_4$ in block 722 as discussed previously. The LOS component vectors $\underline{J}_t^G$, $\underline{K}_t^G$, the quantity $\hat{V}_c$ and $\hat{\lambda}_G$, the Zero effort miss control vector $\underline{Z\hat{E}M}_{TM}{}^G$ divided by $\hat{t}_{go}{}^2$ and the missile acceleration vector multiplied by the gain $C_4$ combine in block 725 to obtain a missile guidance acceleration command vector $\underline{N}^G{}_C$ in the inertial guidance frame which is perpendicular to the LOS.

Figure 11:
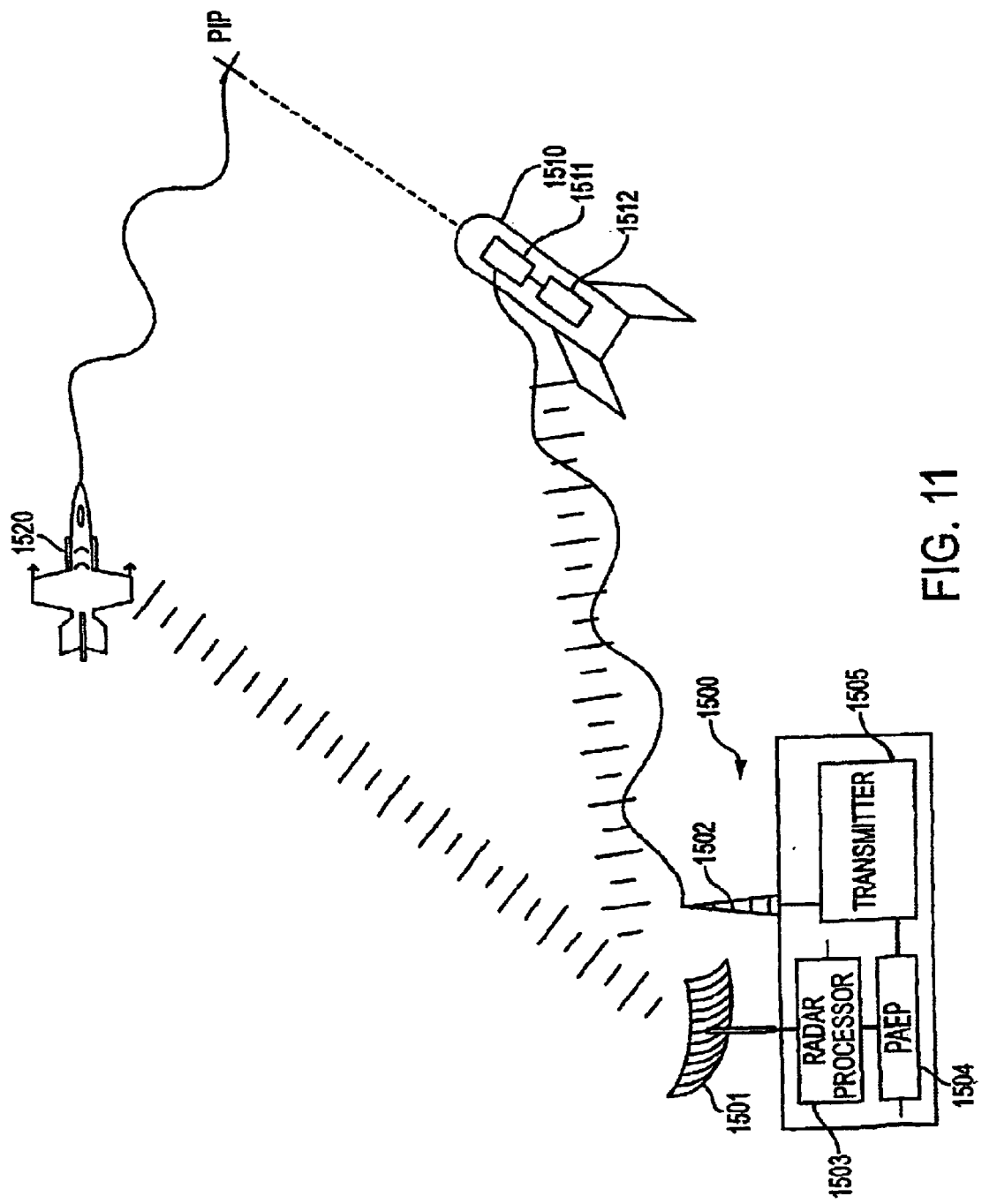
FIG. 11 is a representation of a fire control guidance system for a missile in accordance with an exemplary embodiment of the present invention.

FIG. 11 shows an exemplary embodiment of the present invention applied in a fire control system. The system containing means for generating a signal representing a predicted position of the object from object position parameters relative to a guidance frame and a periodically adaptive estimated object state produced in the guidance frame using the object position parameters; and, means for transmitting the signal to an on-board guidance control of the device.

The fire control platform 1500 tracks the target 1520 through a radar system 1501 in addition also tracks the interceptor missile 1510. The fire control platform can be a fixed ground station, mobile station an aircraft, ship, or space based platform. The missile fire control platform includes a radar processing unit 1503 that determines range and directional information of the target and of the interceptor missile. These values are fed into periodically adaptive object state estimators 1504 which create a predicted intercept position (PIP). The PIP is then transmitted through a transmitter 1505 via an antenna 1502 to a receiver on the interceptor missile 1511 where the missile generates an acceleration command based upon the PIP. Whereas previously exemplary embodiments of the invention are successfully used for terminal guidance, missile file control guidance is particularly suited toward mid-course guidance.

Interceptor missiles due to constraints of energy and weight have a narrow acquisition band which is well suited to close in targets, however a missile fire control radar system, where power supply and size of the radar system is not a limiting factor, can more readily acquire the targets. The missile fire control system can direct the interceptor missile until the interceptor missile can acquire the target with its own tracking system, or direct the missile through termination.

Figure 12:
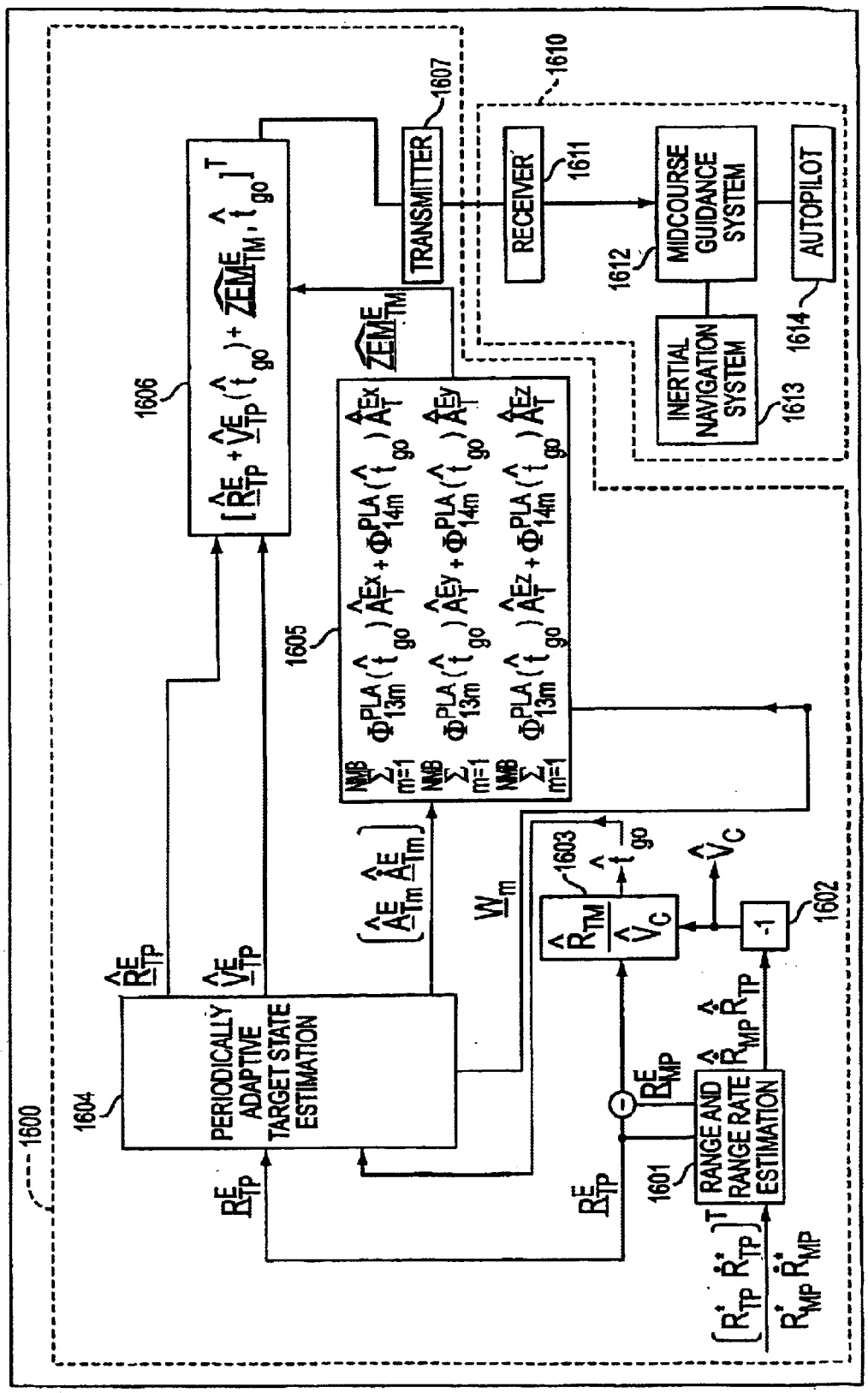
FIG. 12 is a block diagram of periodically adaptive guidance for fire control in accordance with an exemplary embodiment of the present invention.

FIG. 12 shows an exemplary embodiment of periodically adaptive missile fire control system. A missile fire control platform 1600 obtains the range and range rate measurements from it's tracking radar and forms range and range rate estimation in block 1601. These inputs can be the measured range of the target to the platform $R^*_{TP}$, the range rate of from the target to the platform $\dot{R}^*_{TP}$, the range of the missile to the platform $R^*_{MP}$ and the range rate to the platform $\dot{R}^*_{MP}$. The estimating closing velocity $\hat{V}_c$ can be found by subtracting the range rate of the missile to platform from the range rate of the target to platform. From this the closing velocity is found. Also in block 1603 the range of the target to missile is divided by the closing velocity to obtain an estimated time-to-go $\hat{t}_{go}$. The range vector determined from the radar inputs is given as $\underline{R}^B{}_{TP}$ wherein E is in the earth frame.

The periodically adaptive target state estimation creates an estimated target to platform range vector $\hat{R}_{TP}{}^E$, an estimated target to platform velocity vector $\hat{V}_{TP}{}^E$ and multiple model target acceleration state vectors $\hat{A}_{Tm}{}^E$ and $\hat{A}_{Tm}{}^E$ as well as the multiple model probability weighting vectors $W_m$. In the periodic control box of 1605 the multiple model estimated target acceleration state vectors and the multiple model probability weighing vectors are multiplied and summed over the number of Kalman banks in each respective axis. The result is a zero effort miss vector in the earth frame. The output is a predictive intercept position (PIP) formed in block 1606. The PIP is simply the range $\hat{R}_{TP}{}^E$ plus the velocity $\hat{V}_{TP}{}^E$ multiplied by the time-to-go $t_{go}$ plus the zero effort miss vector $Z\hat{E}M_{TM}{}^E$ along with the estimated time-to-go. The PIP is an prediction of the future position of the object at $(T+\hat{t}_{go})$, where T is real time.

This information is transmitted from the missile fire control transmitter 1607. The method of transmission to the missile interceptor 1610 can include RF, wireless or wired means. The uplink is received in receiver 1611 which is fed into the midcourse guidance system 1612 which uses the uplink signal and information form an inertial navigation system 1613 to generate a solution and a missile guidance command enabling the missile to intercept the target. The missile guidance command is relayed to the autopilot 1614 and ultimately to the thruster or other control apparatus.

Because of the relatively non-dynamic relationship between the missile fire control platform and the target small angle approximations can suffice in creating the PIP and reducing the necessity to create a reconstructed vectored LOS.

Although the embodiments are directed to an air-to-air missiles, the application of the claimed subject matter to air-to-surface, surface-to-surface, and surface-to-air missiles, torpedoes or other types of interceptors is equally envisioned.

It is understood that the above described embodiments are merely illustrative of the possible specific embodiments which may represent application of principles of the present invention. Other arrangements may readily be devised in accordance with these principles by those skilled in the art without departing from the scope and spirit of the invention.

What is claimed is:

1. A system for guiding a device toward an object comprising:
    means for generating a guidance command signal from: a vectored line-of-sight (LOS) between a device and an object using a position parameter of the object relative to a guidance frame, and an estimated object state produced in the guidance frame using the vectored line-of-sight, wherein the means for generating adapts the guidance command signal based on an estimate of target maneuver frequency; and
    means for transmitting the guidance command signal to an on-board guidance control of the device.

2. A system for guiding a device toward an object in accordance with claim 1, wherein the means for generating a guidance command signal creates an estimated object to device range vector, an estimated object to device velocity vector and an estimated object acceleration vector.

3. A system for guiding a device toward an object in accordance with claim 2, wherein the means for generating a guidance command signal creates an estimated object acceleration rate vector.

4. A system for guiding a device toward an object in accordance with claim 1, wherein the means for generating a guidance command signal is periodically adaptive.

5. A system for guiding a device toward an object in accordance with claim 1, wherein the means for generating a guidance command signal comprises:
    means for generating a set of probability weights.

6. A system for guiding a device toward an object in accordance with claim 5, wherein the sum of the probability weights for any axis of the guidance frame is unity.

7. A system for guiding a device toward an object in accordance with claim 1, wherein the means for generating a guidance command signal uses sequential line-of-sight (LOS) vectors in the guidance frame.

8. A system for guiding a device toward an object in accordance with claim 1, wherein the means for generating a guidance command signal comprises:

at least one Kalman filter bank.

9. A system for guiding a device toward an object in accordance with claim 8, wherein the at least one Kalman filter bank is harmonically balanced.

10. A system for guiding a device toward an object in accordance with claim 9, wherein each of the at least one Kalman filter bank is associated with a respective axis in the guidance frame.

11. A system for guiding a device toward an object in accordance with claim 1, wherein the means for generating a guidance command signal comprises:

a proportional navigation controller.

12. A system for guiding a device toward an object in accordance with claim 1, wherein the means for generating a guidance command signal comprises:

an augmented proportional navigational controller.

13. A system for guiding a device toward an object in accordance with claim 1, wherein the means for generating a guidance command signal comprises:

a classical optimal controller.

14. A system for guiding a device toward an object in accordance with claim 1, wherein the means for generating a guidance command signal is recursively adaptive.

15. A method for guiding a device toward an object comprising the steps of:

creating a vectored object line-of-sight (LOS) in a guidance frame;

producing an estimated object state, using sequential object LOS;

using proportional navigation control to create a device guidance command as a function of an estimated range vector and an estimated velocity vector obtained using the estimated object state, wherein the device guidance command is adapted based on an estimate of target maneuver frequency.

16. A method for guiding a device toward an object in accordance with claim 15, wherein the estimated object state is adaptively produced.

17. A method for guiding a device toward an object in accordance with claim 16, comprising the steps of:

creating a periodically adaptive guidance command using estimated object state; and, adding the periodically adaptive guidance command to the device guidance command.

18. A method for guiding a device toward an object according to claim 17, wherein the step of creating an periodically adaptive guidance command comprises the step of:

using a function of object maneuver frequencies, time-to-go before intercept, maneuver frequency correlation time constants, estimated target accelerations and estimated object acceleration rates.

19. A method for guiding a device toward an object according to claim 16, wherein the step of creating a device guidance command comprises the step of:

creating a guidance command operating on device acceleration to compensate for autopilot lag.

20. A method for guiding a device toward an object in accordance with claim 15, wherein the step of creating a vectored object line-of-sight comprises the steps of:

a) obtaining azimuth, elevation and range information of an object;

b) using the azimuth, elevation and range information for vectored LOS reconstruction to create a unit vector representative of the object's orientation in a guidance frame of the device; and, c) applying the range information to the output of the vectored LOS reconstruction to create the estimated range.

21. A method for guiding a device toward an object in accordance with claim 20, wherein the step of producing an estimated object state comprises the step of:

processing plural sequential estimated range vectors into an object state estimator in an inertial guidance frame estimated object state, wherein the estimated object state includes range, velocity, object acceleration and object acceleration rate.

22. A guidance system for guiding a device toward an object comprising:

means for generating a signal representing a predicted position of the object from: object position parameters relative to a guidance frame and a periodically adaptive estimated object state produced in the guidance frame using the object position parameters, wherein the means for generating adapts the signal based on an estimate of target maneuver frequency; and, means for transmitting the signal to an on-board guidance control of the device.

23. A guidance system for guiding a device toward an object according to claim 22, comprising:

a fire control platform wherein the means for generating a signal representing the predicted position of the object is located on the fire control platform, and the fire control platform is remote from the device.

24. A method for guiding a device toward an object comprising the steps of:

obtaining object position parameters;

periodically adaptively producing an estimated object state;

creating a predicted position from the estimated object state; and, determining a guidance command from the predicted position of the object, wherein the guidance command is adapted based on an estimate of target maneuver frequency.

25. A method for guiding a device toward an object according to claim 24, comprising the steps of:

transmitting the predicted position of the object from a remote location to the device;

wherein the step of determining a guidance command is performed on the device.

26. A method for guiding a device toward an object according to claim 24, comprising the steps of:

obtaining device position parameters;

determining at a remote location a time-to-intercept; and, transmitting the time-to-intercept from the remote location to the device.

* * * * *